United States Patent

Reinbold et al.

[11] Patent Number: 6,161,384
[45] Date of Patent: Dec. 19, 2000

[54] TURBOCHARGER CONTROL MANAGEMENT SYSTEM THROTTLE RESERVE CONTROL

[75] Inventors: Edward O. Reinbold, Waukesha; James R. Zurlo, Shorewood; James A. Davis, Green Lake; Dennis W. Moss, Waukesha; Mark J. Carls, Eagle; William D. Briggs, Waukesha, all of Wis.

[73] Assignee: Waukesha Engine Division, Dresser Equipment Group, Inc., Dallas, Tex.

[21] Appl. No.: 09/241,691

[22] Filed: Feb. 2, 1999

Related U.S. Application Data

[60] Continuation-in-part of application No. 09/232,087, Jan. 15, 1999, which is a division of application No. 08/812,064, Jan. 31, 1997, Pat. No. 5,950,432, which is a continuation of application No. 08/472,474, Jun. 7, 1995, Pat. No. 5,605,044, which is a division of application No. 08/236,467, May 2, 1994, Pat. No. 5,551,236.

[51] Int. Cl.[7] .................................................... F02D 23/00
[52] U.S. Cl. ................................................................ 60/602
[58] Field of Search .................................................. 60/602

[56] References Cited

U.S. PATENT DOCUMENTS

| | | |
|---|---|---|
| 3,195,805 | 7/1965 | Cholvin et al. . |
| 3,257,796 | 6/1966 | Updike . |
| 3,303,348 | 2/1967 | Cox et al. . |
| 3,941,035 | 3/1976 | Mueller . |
| 4,005,578 | 2/1977 | McInerney . |
| 4,005,579 | 2/1977 | Lloyd . |
| 4,378,677 | 4/1983 | Zumstein . |
| 4,424,675 | 1/1984 | Ojima . |
| 4,449,367 | 5/1984 | Moriguchi et al. . |
| 4,459,809 | 7/1984 | Tadokoro et al. . |
| 4,468,928 | 9/1984 | Suzuki . |
| 4,490,622 | 12/1984 | Osborn . |
| 4,528,816 | 7/1985 | Arnaud . |
| 4,548,038 | 10/1985 | Matsuki . |
| 4,597,264 | 7/1986 | Cipolla . |
| 4,612,900 | 9/1986 | Iwata et al. . |
| 4,651,561 | 3/1987 | Ueno et al. . |
| 4,656,834 | 4/1987 | Elpern . |
| 4,763,475 | 8/1988 | Toshio et al. . |
| 4,848,086 | 7/1989 | Inoue et al. . |
| 4,970,864 | 11/1990 | Kazuo et al. . |
| 5,036,669 | 8/1991 | Earleson et al. . |
| 5,083,434 | 1/1992 | Dahlgren et al. . |
| 5,119,633 | 6/1992 | Brooks et al. . |
| 5,142,868 | 9/1992 | Woon et al. . |
| 5,155,998 | 10/1992 | Monden . |
| 5,199,261 | 4/1993 | Baker . |
| 5,214,919 | 6/1993 | Jiewertz et al. . |
| 5,224,853 | 7/1993 | Kazuo et al. . |
| 5,228,292 | 7/1993 | Hanauer et al. . |
| 5,231,830 | 8/1993 | Entenmann et al. . |
| 5,271,228 | 12/1993 | Kawakami . |
| 5,289,683 | 3/1994 | Kurihara . |
| 5,400,597 | 3/1995 | Mirabile . |
| 5,408,979 | 4/1995 | Backlund et al. . |
| 5,442,920 | 8/1995 | Kamel et al. . |
| 5,454,225 | 10/1995 | Sumser et al. . |
| 5,551,236 | 9/1996 | Zimmer et al. . |
| 5,605,044 | 2/1997 | Zimmer et al. . |
| 5,816,047 | 10/1998 | Zurlo . |

FOREIGN PATENT DOCUMENTS

| | | |
|---|---|---|
| 0035691 | 9/1981 | European Pat. Off. . |
| 0084037 | 7/1983 | European Pat. Off. . |
| 0111196 | 6/1984 | European Pat. Off. . |
| 2647836 | 4/1978 | Germany . |
| 3005108 | 8/1981 | Germany . |
| 3129686 | 2/1983 | Germany . |
| 3539578 | 6/1986 | Germany . |
| 3-47439 | 2/1991 | Japan . |
| 673 684 | 3/1990 | Switzerland . |
| 1698468 | 12/1991 | U.S.S.R. . |
| WO 81/02607 | 9/1981 | WIPO . |
| WO93/08394 | 4/1993 | WIPO . |

*Primary Examiner*—Noah P. Kamen
*Attorney, Agent, or Firm*—Andrus, Sceales, Starke & Sawall, LLP

[57] ABSTRACT

A controlled power system and method for an internal combustion engine having a turbocharger controls the engine to vary differential pressure across the throttle, delta P, throttle reserve, according to a predetermined throttle reserve profile relative to at least one engine parameter.

35 Claims, 13 Drawing Sheets

FIG. 10
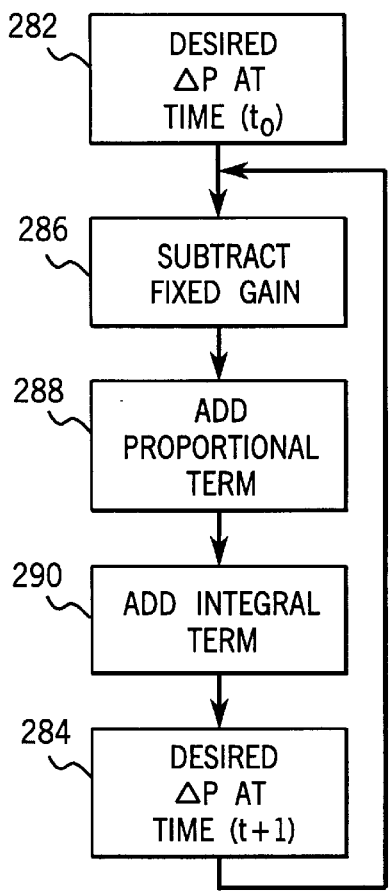
FIG. 18
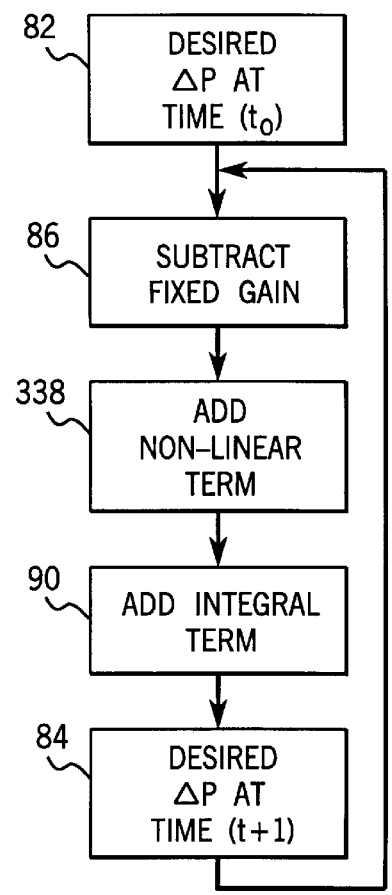
FIG. 17
| POINT | RESERVE ERROR, IN-Hg | GAIN, % |
|---|---|---|
| 1 | -10.0 | 49 |
| 2 | -8.0 | 29 |
| 3 | -6.0 | 21 |
| 4 | -4.0 | 15 |
| 5 | -2.0 | 12 |
| 6 | 0 | 9 |
| 7 | 2.0 | 12 |
| 8 | 4.0 | 15 |
| 9 | 6.0 | 21 |
| 10 | 8.0 | 29 |
| 11 | 10.0 | 49 |
| 12 | 12.0 | 64 |

| | RPM 750 | | RPM 800 | | RPM 900 | | RPM 950 | | RPM 1010 | | RPM 1020 | |
|---|---|---|---|---|---|---|---|---|---|---|---|---|
| THROTTLE RESERVE EDITING | | | | | | | | | | | | |
| Pa IS MAP PRESS. Abs (In Hg) Res IS RESERVE DIFFERENTIAL PRESS. (In Hg) | | | | | | | | | | | | |
| | Pa | Res | Pa | Res | Pa | Res | Pa | Res | Pa | Res | Pa | Res |
| 1 | 30 | 25.0 | 30 | 25.0 | 30 | 25.0 | 30 | 25.0 | 30 | 25.0 | 30 | 5.0 |
| 2 | 35 | 15.0 | 35 | 15.0 | 35 | 15.0 | 35 | 15.0 | 35 | 15.0 | 35 | 5.0 |
| 3 | 45 | 15.0 | 45 | 15.0 | 45 | 15.0 | 45 | 15.0 | 45 | 15.0 | 45 | 5.0 |
| 4 | 55 | 15.0 | 55 | 15.0 | 55 | 15.0 | 55 | 15.0 | 55 | 15.0 | 55 | 5.0 |
| 5 | 65 | 15.0 | 65 | 15.0 | 65 | 15.0 | 65 | 15.0 | 65 | 15.0 | 65 | 5.0 |
| 6 | 70 | 15.0 | 70 | 15.0 | 70 | 15.0 | 70 | 15.0 | 70 | 15.0 | 70 | 5.0 |
| 7 | 88 | 15.0 | 89 | 13.0 | 90 | 13.0 | 92 | 13.0 | 92 | 13.0 | 92 | 5.0 |
| 8 | 91 | 15.0 | 92 | 0.0 | 93 | 0.0 | 95 | 0.0 | 95 | 0.0 | 95 | 5.0 |

TURBOCHARGER CONTROL MANAGEMENT SYSTEM THROTTLE RESERVE CONTROL

CROSS REFERENCE TO RELATED APPLICATIONS

This application is a continuation-in-part of commonly owned U.S. application Ser. No. 09/232,087 filed Jan. 15, 1999, which is a division of U.S. application Ser. No. 08/812,064, filed Jan. 31, 1997, which is a continuation of U.S. application Ser. No. 08/472,474, filed Jun. 7, 1995, now U.S. Pat. No. 5,605,044, which is a division of U.S. application Ser. No. 08/236,467, filed May 2, 1994, now U.S. Pat. No. 5,551,236, and relates to commonly owned U.S. application Ser. No. 08/707,009, filed Sep. 3, 1996, now U.S. Pat. No. 5,816,047, all incorporated herein by reference.

FIELD OF THE INVENTION

The invention relates to a turbocharger control and management system for maximizing the efficiency of a turbocharger and an internal combustion engine.

BACKGROUND OF THE INVENTION

A turbocharger includes a compressor and a turbine. The turbine drives the compressor with exhaust energy created by the internal combustion engine. The engine exhaust drives a turbine wheel in the turbine of the turbocharger and is discharged through an exhaust system. The turbine wheel drives a shaft connected to a compressor wheel in the compressor which pressurizes intake air, previously at atmospheric pressure, and forces it typically through an intercooler and over a throttle valve and into an engine intake manifold. Controlling the output of the turbocharger to obtain desired engine operation has been a long standing problem. Too much output can create erratic engine performance and permanently damage engine components. Too little output causes engine hesitation and loss of power. Additionally, changes in atmospheric pressure, ambient temperature and engine speed affect the overall efficiency of the turbocharger which directly affects the performance, power output, and fuel economy of the engine.

Prior to the invention of the noted U.S. Pat. No. 5,551,236, hereinafter the '236 patent, some turbocharger systems used a bypass valve connected to the output of the compressor to relieve excessive pressure. Typically, the bypass valve of these prior art systems sensed the differential pressure between the compressor discharge and intake manifold, i.e. the pressure difference across the throttle valve, and opened the bypass valve to vent pressure at a given threshold and remained open until the pressure fell below the threshold level. Other systems used a wastegate between the exhaust manifold discharge and the exhaust system to regulate the turbocharger by diverting engine exhaust energy from the turbine. The wastegate of this prior system was actuated by a compressor discharge pressure sensing type valve. Because these systems operated independently, and both were either opened or closed depending on the compressor discharge pressure, the turbocharger had a very limited range of operation. The range was so limited that it was necessary to use different turbocharger hardware, i.e. turbine and compressor wheels, for varying attitudes of operation and engine configurations.

Since the turbocharger's compressor and turbine wheels are sized not only for altitude, but also to achieve a rated power horsepower at a desired speed for each particular engine, the power and torque output of an engine would drop dramatically when the engine is run at less than the rated speed or at a different altitude because the pressure sensing valves were only dependent on compressor discharge pressure and would actuate regardless of engine speed. For example, an engine rated at 190 psi BMEP (braking mean effective pressure) at 1,000 rpm, would have trouble producing 190 psi BMEP at 700 rpm because of the reduced output of the turbocharger due to the falling speed and because of the mechanical pressure sensing and releasing valves previously used.

Typically, large industrial internal combustion engines operate for long periods and are capable of generating thousands of horsepower. These engines are designed to operate at 10% over rated load intermittently, and are used for generating electrical power, pumping natural gas and oil powering large ships and off-shore well drilling operations, and so on. In such applications, it is desirable to produce maximum power and/or maintain maximum torque at reduced engine speeds. However, because previous turbocharger control systems were simply a function of the compressor discharge pressure, the mechanical valves would release pressure regardless of the engine's speed and therefore regardless of the engine's need. Under such circumstances, when the engine speed is reduced but the load is maintained, the engine requires near constant intake manifold pressure to maintain torque output. Under these conditions, it would be desirable to adjust the bypass valve to change total mass airflow and adjust the wastegate to direct more engine exhaust to the turbocharger in order to produce near constant intake manifold pressure such that the compressor operates more efficiently at these speed and load conditions.

The invention of the '236 patent provides a simple and effective method and system for maintaining engine torque output at lower than rated speeds and at varying ambient temperatures and barometric pressures by stabilizing the turbocharger output within a predetermined range of efficient operation. The invention of the '236 patent provides an electronic turbocharger control system, including a wastegate and bypass valve, which eliminates the need for matching individual compressor and turbine wheels of a turbocharger for each particular engine configuration and application. This particular aspect of the invention of the '236 patent allows a manufacturer to use one set of turbocharger hardware for various engine applications. For example, prior to the invention of the '236 patent, as many as 13 different turbocharger wheels would be required to adequately cover a 0–7,000 foot above sea level range of elevations. With the invention of the '236 patent, one set of turbocharger hardware can be used at all elevations in this desired range. Further economic advantage is gained not only by the low cost of the electronic control relative to the high cost of the compressor and turbine wheels, but also by the elimination of inventory and the need for custom wheels for special applications. Customer satisfaction may also be greatly improved by the elimination of long procurement leadtimes for replacement components. The invention of the '236 patent provides constant torque at varying engine speeds allowing an operator to obtain additional load at reduced engine speed for improved fuel economy. The invention of the '236 patent provides maximum power over a range of engine speeds while maintaining the turbocharger in its most efficient range of operation. The invention of the '236 patent provides a control system which maintains turbocharger efficiency within a desired range of pressure ratio versus mass air-flow rates.

The invention of the noted U.S. Pat. No. 5,816,047, hereinafter the '047 patent, relates to an electronically controlled wastegate valve on a turbocharged internal combustion engine. In particular, the invention of the '047 patent relates to a control system and method that adaptively adjusts the throttle pressure reserve to improve load acceptance when the load on the engine is fluctuating, and optimize engine efficiency when the load on the engine is relatively steady. The invention of the '047 patent is primarily directed to large industrial internal combustion engines that are fueled by natural gas, and are intended to operate for long periods, and are capable of generating thousands of horsepower. These large engines are typically used for generating, electrical power, pumping natural gas and oil, or powering offshore well drilling operations, and so on.

The invention of the '047 patent applies to turbocharged internal combustion engines having a wastegate valve. A turbocharger includes a turbine and a compressor. In a turbocharged engine, exhaust drives a turbine wheel in the turbine, which in turn drives a shaft connected to a compressor wheel in the compressor. The exhaust exiting the turbocharger discharges through an exhaust outlet duct. The compressor typically pressurizes or turbocharges ambient air, and forces the pressurized intake air through an intercooler and a carburetor (or other fuel addition device such as electronic fuel injection), past a throttle valve, and into an engine intake manifold. In some systems, the carburetor is located upstream of the compressor so the compressor pressurizes a mixture of fuel and air. Exhaust discharges from the engine through an engine exhaust manifold, and is directed through an exhaust manifold discharge duct to the turbine of the turbocharger. A wastegate valve is often provided to divert some or all of the engine exhaust energy away from the turbine of the turbocharger. Usually, the wastegate valve is located within a passage between the exhaust manifold discharge duct and the exhaust system outlet duct.

Using a standard wastegate control otherwise known as a maximum boost regulator, the wastegate valve remains closed until the pressure of the pressurized intake air from the compressor becomes large enough to actuate a spring mechanism in the wastegate actuator to open the wastegate valve. The system thus diverts engine exhaust away from the turbine in the turbocharger when the compressor discharge pressure reaches a maximum boost value. In such a maximum boost system, the wastegate valve remains closed at light loads and continues to remain closed until the engine reaches about 80% to 90% of full load. Even when the throttle is fully open in a maximum boost system, opening the wastegate valve will reduce the amount of energy supplied to the turbine in the turbocharger, and in turn will maintain the compressor discharge pressure at the maximum boost value.

It is known in the art to use a fixed $\Delta P$ wastegate control in conjunction with a maximum boost regulator. In a fixed $\Delta P$ wastegate control, the wastegate valve is adjusted to maintain a fixed pressure reserve across a throttle (i.e. a fixed pressure drop across the throttle at light or medium engine loads). Compared to the standard wastegate control using only a maximum boost regulator, the fixed $\Delta P$ wastegate control tends to improve engine efficiency at light and medium loads due to reduced exhaust pressure and the associated pumping losses. The maximum boost regulator in a fixed $\Delta P$ wastegate control operates in a similar manner to the standard wastegate control to limit the maximum compressor discharge pressure. In a fixed $\Delta P$ wastegate control, the throttle pressure reserve can be monitored mechanically using a pressure tap upstream of the throttle and another pressure tap downstream of the throttle. The pressure difference between the pressure taps typically drives a spring actuated wastegate valve actuator. Alternatively, the throttle pressure reserve can be determined electronically by sensing the pressure both upstream and downstream of the throttle, and subtracting the two sensed pressures electronically to determine a pressure difference across the throttle.

Large industrial internal combustion engines typically operate at a fixed speed, but the load on the engine varies. If there is a large increase in the load, the throttle on the engine opens and the pressure difference across the throttle drops, which provides an initial increase in engine power output. In other words, the throttle pressure reserve provides the initial increase in engine power output. The remaining increase in power output is due to the fact that the turbocharger will continually speed up as the wastegate remains closed. The wastegate will remain closed until the throttle pressure reserve (i.e. the pressure drop across the throttle) recovers. It takes a relatively long time (e.g. 5 seconds) for the turbocharger to speed up and for the pressure drop across the throttle to recover completely. In large industrial internal combustion engines having a fixed $\Delta P$ wastegate control, the desired throttle pressure reserve is normally chosen to compromise between reasonable fuel consumption and yet maintaining satisfactory load acceptance.

With a fixed $\Delta P$ wastegate control, engine efficiency can be improved by maintaining a low pressure drop across the throttle, but the load acceptance of the engine is reduced. A higher throttle pressure reserve permits the engine to accept greater loads at constant speed or to accelerate a constant load upon the opening of the throttle without hesitation due to the lack of intake manifold pressure. However, to obtain optimum engine efficiency, it is desired to maintain the throttle in an open position thus reducing the throttle pressure reserve and the load acceptance of the engine. There is therefore a trade-off between engine response and fuel consumption.

It can be appreciated that it would be desirable to maintain a relatively small throttle pressure reserve to improve engine efficiency when the load on the engine is relatively stable, yet maintain a relatively large throttle pressure reserve to improve engine load acceptance when the load on the engine fluctuates. The invention of the '047 patent provides an adaptive wastegate control in which the desired throttle pressure reserve, or $\Delta P$ set point, is determined depending upon the history of the engine load, or the history of some other factor such as engine speed or intake manifold absolute pressure which can give an indication of engine load. In this manner, the invention of the '047 patent provides a large throttle pressure reserve when the engine load is fluctuating, thus improving the engine response to load changes, and a smaller throttle pressure reserve when the engine load is relatively stable, thus improving fuel consumption.

In particular, the preferred embodiment of the invention of the '047 patent involves the use of an electronic controller that receives a signal from a pressure transducer located upstream of the throttle, a signal from another pressure transducer located downstream of the throttle, and an engine load signal from an engine load sensor. The electronic controller generates a wastegate control signal that instructs a wastegate actuator to close or to open the wastegate valve. The electronic controller adaptively generates a desired throttle pressure reserve value that depends at least in part upon the prior history of the engine load. If the pressure drop across the throttle, as determined from signals from the upstream and downstream pressure transducer, is greater than the desired throttle pressure reserve value, the electronic controller generates a wastegate control signal instructing the wastegate valve to open. If the pressure drop across the throttle is less than the desired throttle pressure reserve value, the electronic controller instructs the wastegate actuator to close the wastegate valve. Since the desired throttle pressure reserve value depends at least in part on the history of the engine load, the electronic controller can provide a relatively large throttle pressure reserve for fluctuating loads to improve load acceptance, and cam provide a relatively low throttle pressure reserve to improve fuel consumption when the loads are relatively steady.

The desired throttle pressure reserve value in the '047 patent is consistently driven downward, thus improving engine efficiency or fuel consumption absent a significant fluctuation in the engine load to drive the desired pressure reserve value upward. This can be accomplished in the electronic controller by applying a constant negative gain term, as well as engine load terms, in a loop update scheme. It is not necessary that this type of adaptive scheme be used over all ranges of engine load. For instance, in industrial electrical power applications, engine efficiency at light engine loads is relatively unimportant, so it may be desirable to set the throttle pressure reserve at a high level for light loads, and use an adaptive scheme to improve engine efficiency at higher loads only.

Engine load can be monitored in several ways. One practical way for monitoring change in engine load is to monitor engine speed such as with an engine rpm sensor. Engine speed change is a fairly good surrogate for engine load change especially in large industrial applications. The invention of the '047 patent achieves its primary objective of allowing large industrial internal combustion engines to improve fuel consumption at steady loads, yet provide sufficient throttle pressure reserve for satisfactory load acceptance when the load on the engine is fluctuating.

SUMMARY OF THE INVENTION

The present invention controls the engine to vary differential pressure across the throttle, $\Delta P$, also known as throttle reserve, according to a predetermined throttle reserve profile relative to at least one engine parameter. In preferred form, throttle reserve is controlled according to engine speed and engine load.

A set of throttle reserve profiles in a plot of throttle reserve versus engine load have a first engine speed range having a first high throttle reserve value at a first low engine load value, a second main operational throttle reserve value at a series of second main operational engine load values, and a third low throttle reserve value at a third high engine load value. The throttle reserve is preferably varied by controlling a wastegate connected to the turbine and having a closed condition providing maximum boost, and an open condition providing minimum boost, of the turbocharger. The noted first high throttle reserve value is set at an unobtainably high value such that the wastegate is continually driven towards its closed condition at the noted first low engine load value. The noted third low throttle reserve value is set at a low enough value to eventually cause the engine to stall, such that the wastegate is continually driven towards its open condition at the noted third high engine load value.

The noted second main operational throttle reserve value lies along an operational range of engine load values having a high end and a low end. The noted first high throttle reserve value is set along a low load range of engine load values extending toward lower engine load values from the low end of the operational range. The noted third low trottle reserve value is set along a high load range of engine load values extending toward higher engine load values from the high end of the operational range. The noted operational range along the plot is substantially longer than each of the low load and high load ranges. The slope of the profile of the plot along the low load range is substantially steeper than the slope along the operational range. The slope of the profile of the plot along the high load range is also substantially steeper than the slope along the operational range.

A secondary throttle reserve profile is provided for a second engine speed range having a fourth throttle reserve value, the second engine speed range being higher than the first engine speed range. The fourth throttle reserve value is less than the noted first and second throttle reserve values, and greater than the noted third throttle reserve value.

A desired $\Delta P$ at a future time $t_1$ is set by adding an error term to desired $\Delta P$ at a present time $t_0$. The error term is a function of the difference between observed $\Delta P$ and desired $\Delta P$. The proportional gain term is varied nonlinearly with throttle reserve error, to rapidly bring $\Delta P$ within a given window, and then more slowly change $\Delta P$ once it is within such window.

BRIEF DESCRIPTION OF THE DRAWINGS

RELATED APPLICATIONS

Figure 1:
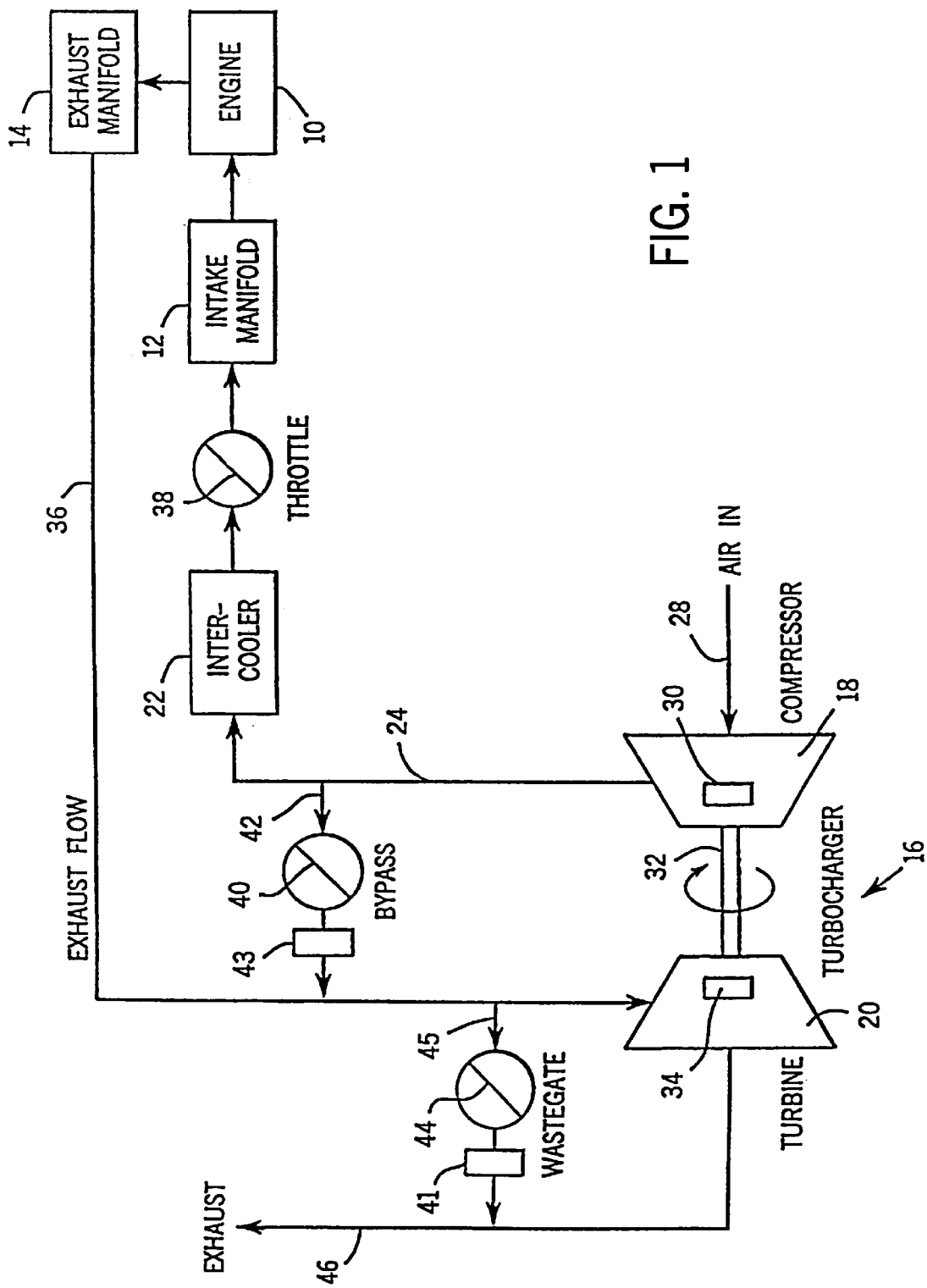

FIG. 1 is taken from FIG. 1 of the '236 patent and is a schematic illustration of a power system.

Figure 2:
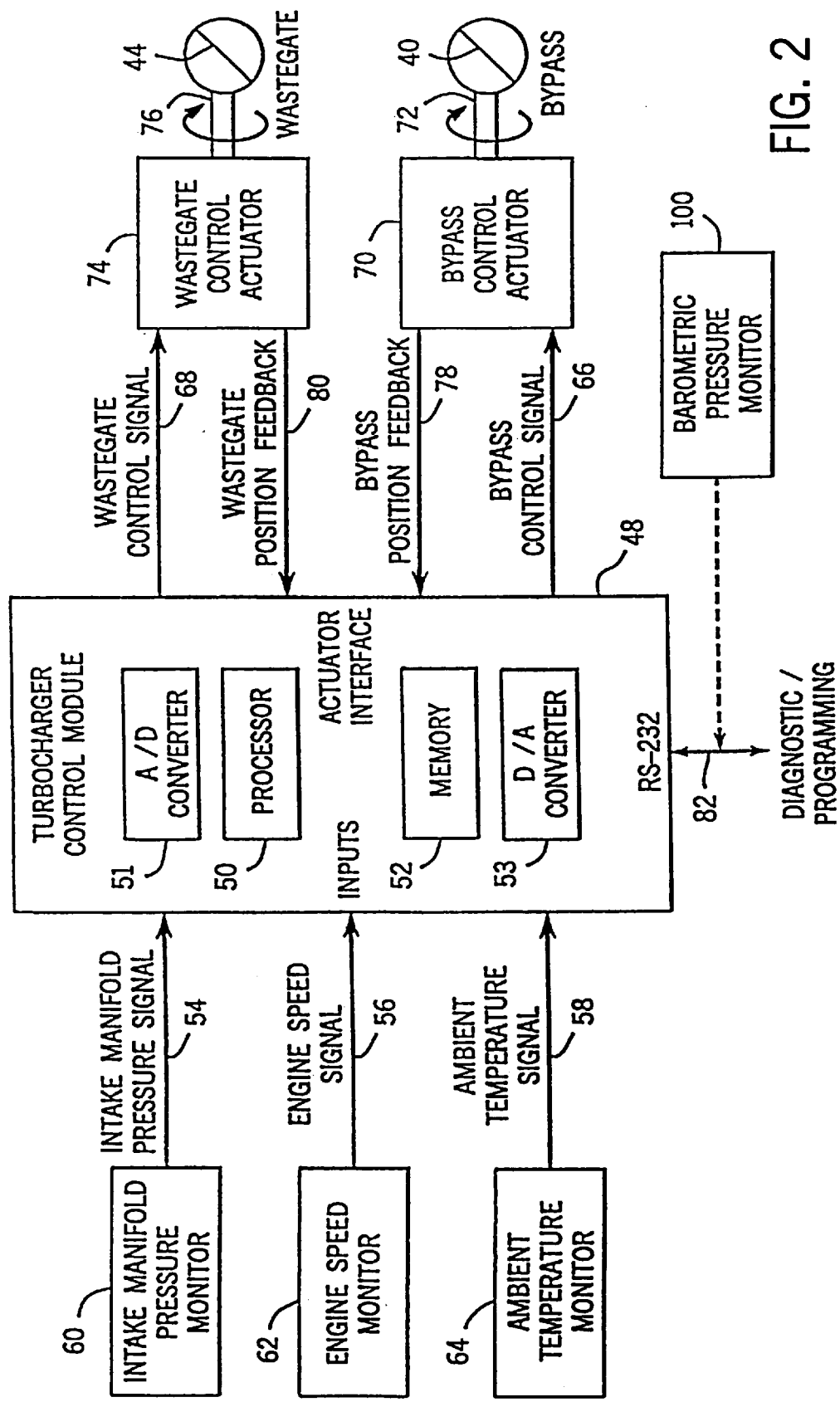

FIG. 2 is taken from FIG. 2 of the '236 patent and is a schematic illustration of a control system.

Figure 3:
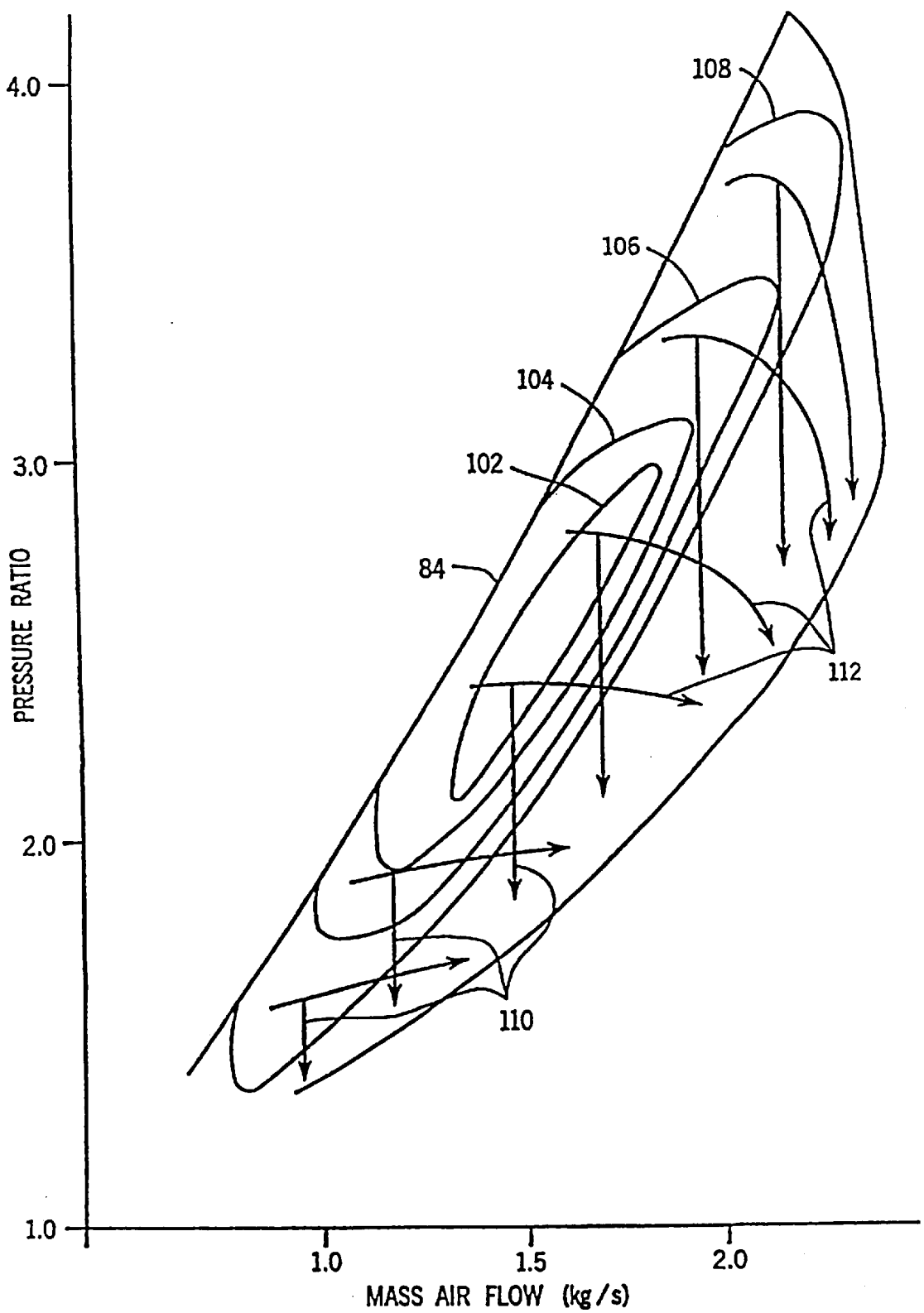

FIG. 3 is taken from FIG. 3 of the '236 patent and is a typical graph of a ratio of compressor discharge pressure over barometric pressure versus mass air flow of a turbocharger compressor.

Figure 4:
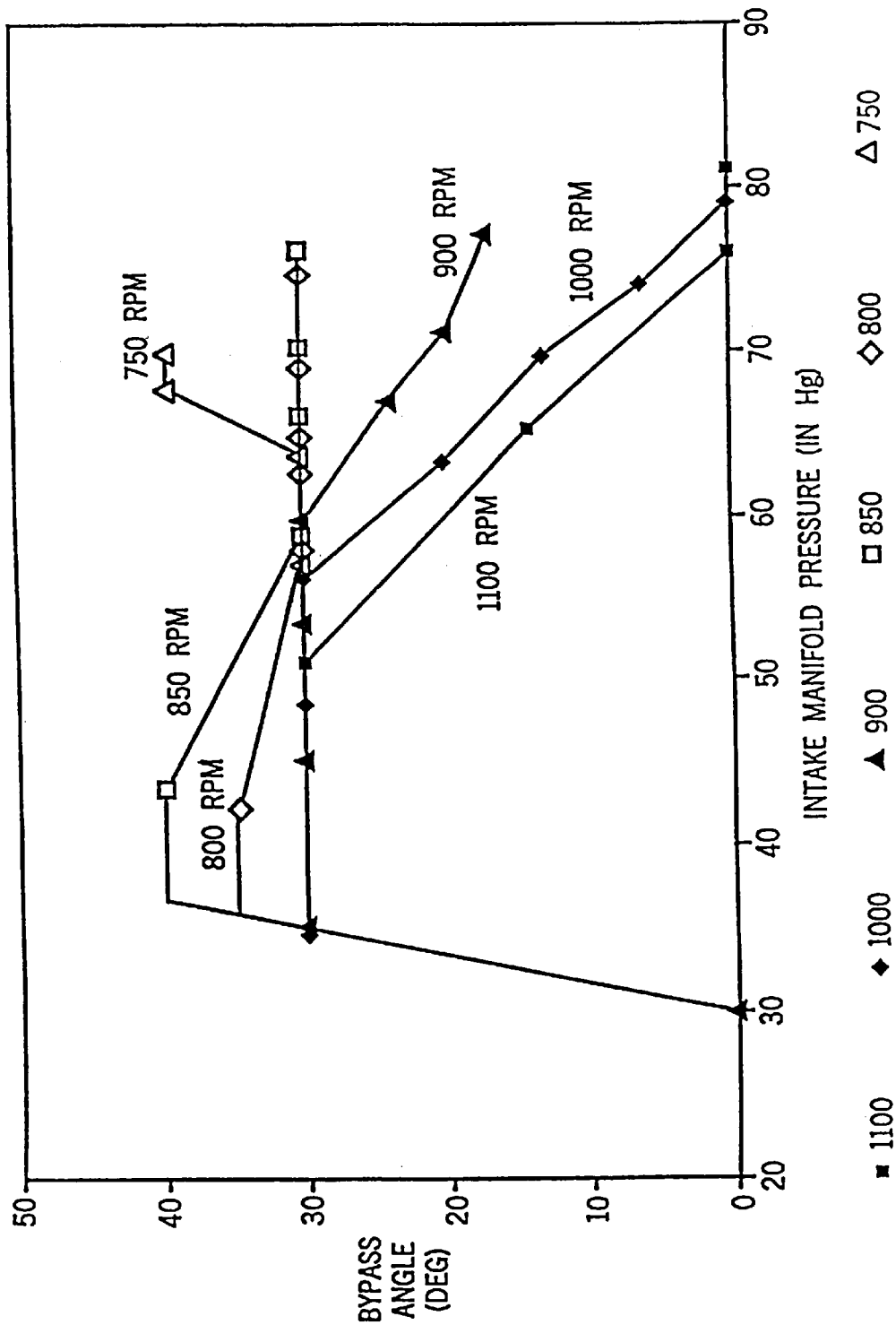

FIG. 4 is taken from FIG. 4 of the '236 patent and is a typical graph of the bypass valve position versus intake manifold pressure.

Figure 5:
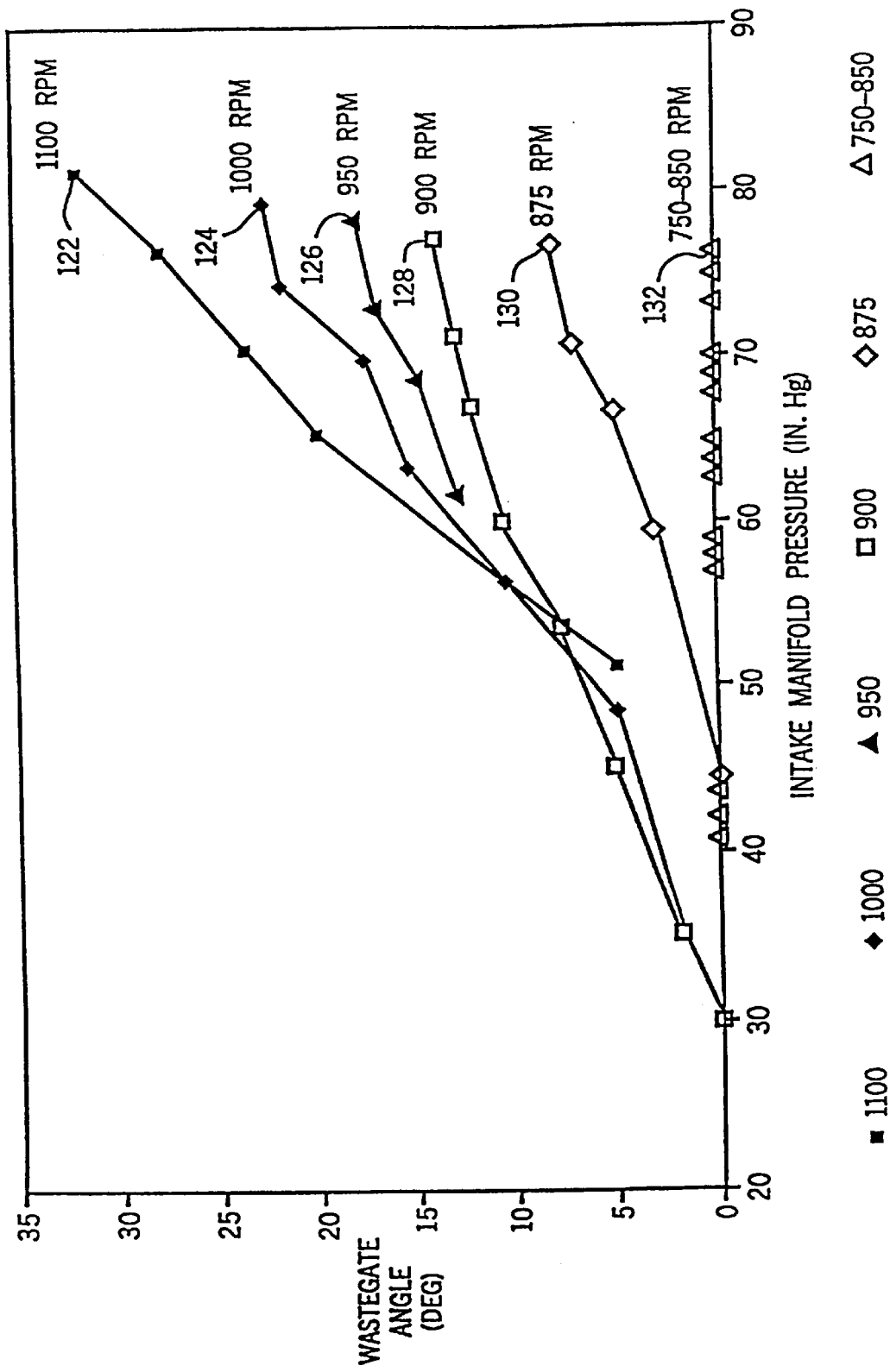

FIG. 5 is taken from FIG. 5 of the '236 patent and is a typical graph of the wastegate position versus intake manifold pressure.

Figure 6:
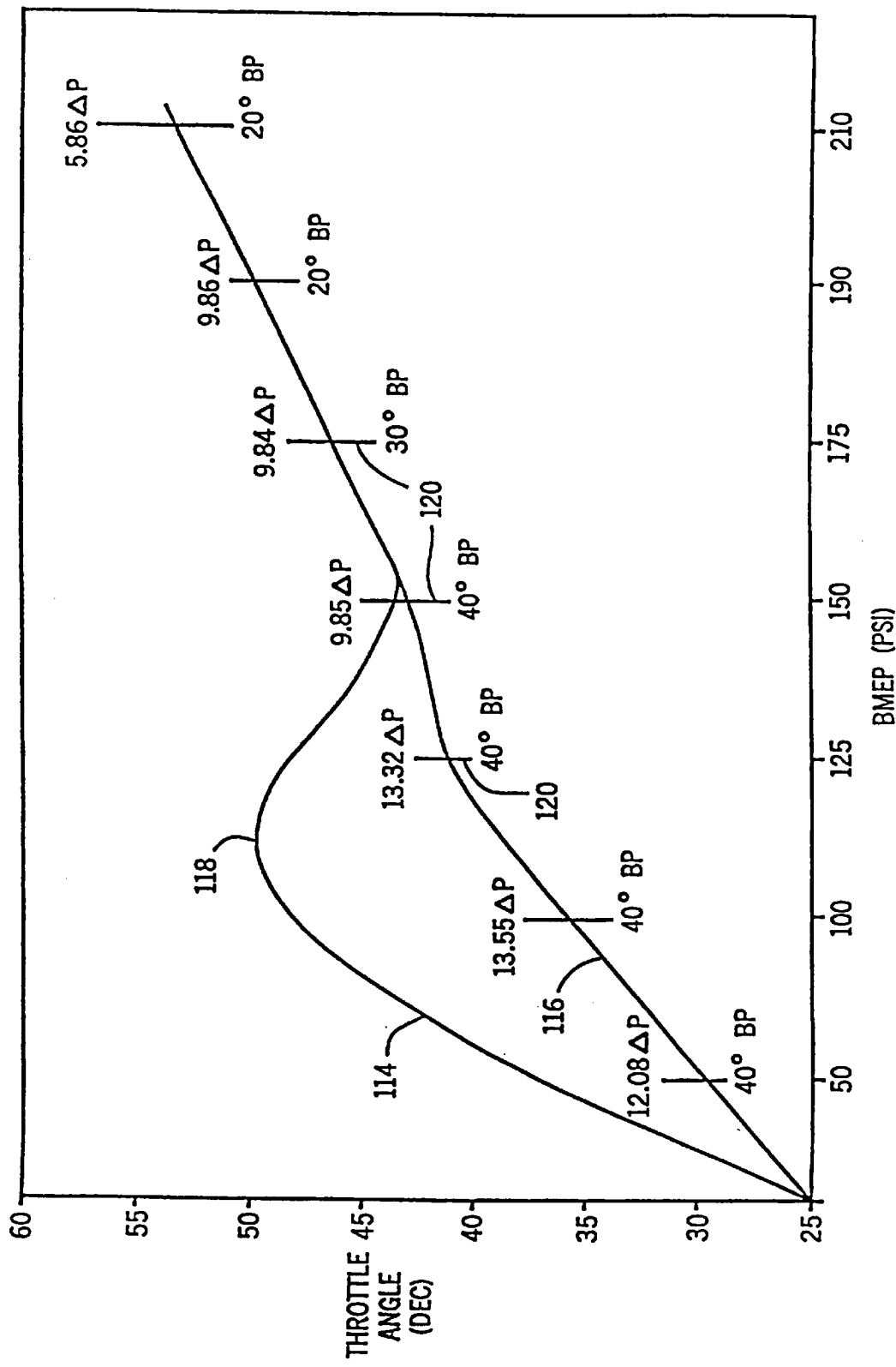

FIG. 6 is taken from FIG. 6 of the '236 patent and is a typical graph of throttle angle position versus brake mean effective pressure.

Figure 7:
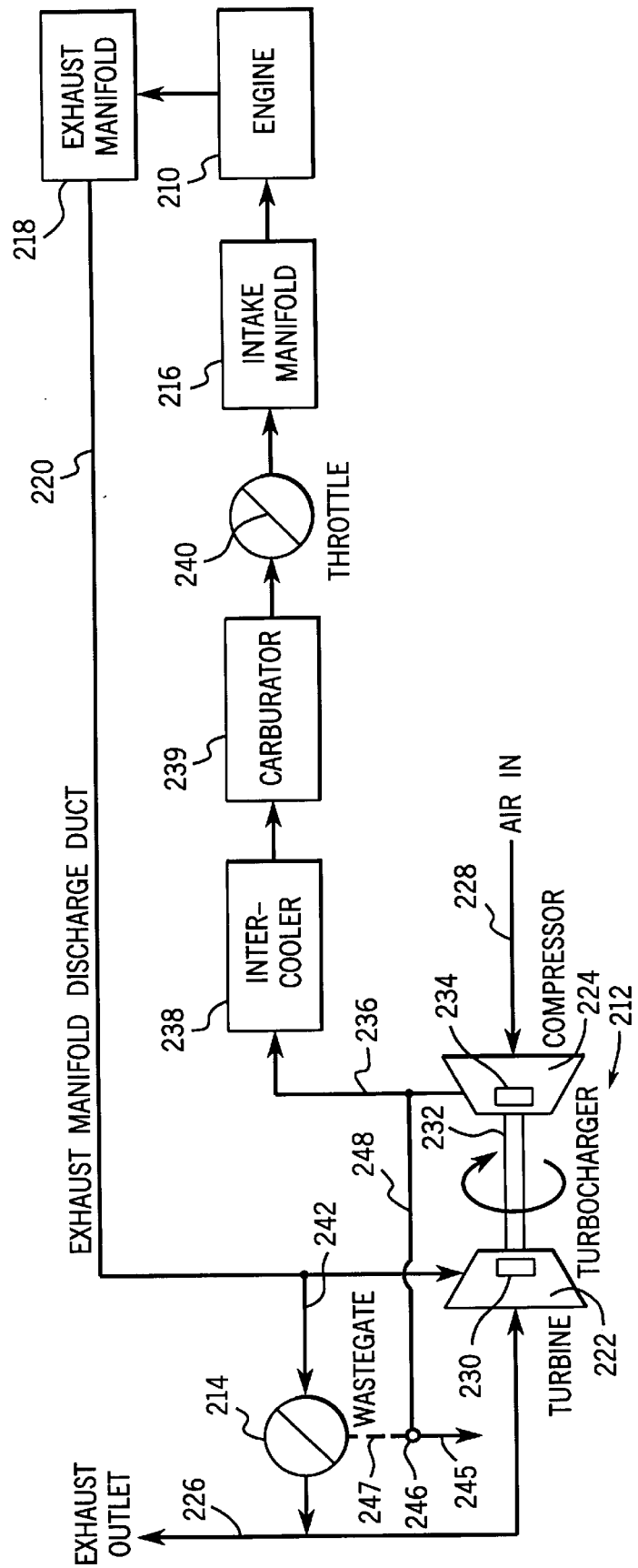

FIG. 7 is taken from FIG. 1 of the '047 patent and is a schematic drawing illustrating a turbocharged internal combustion engine with a standard wastegate control as is known in the prior art.

Figure 8:
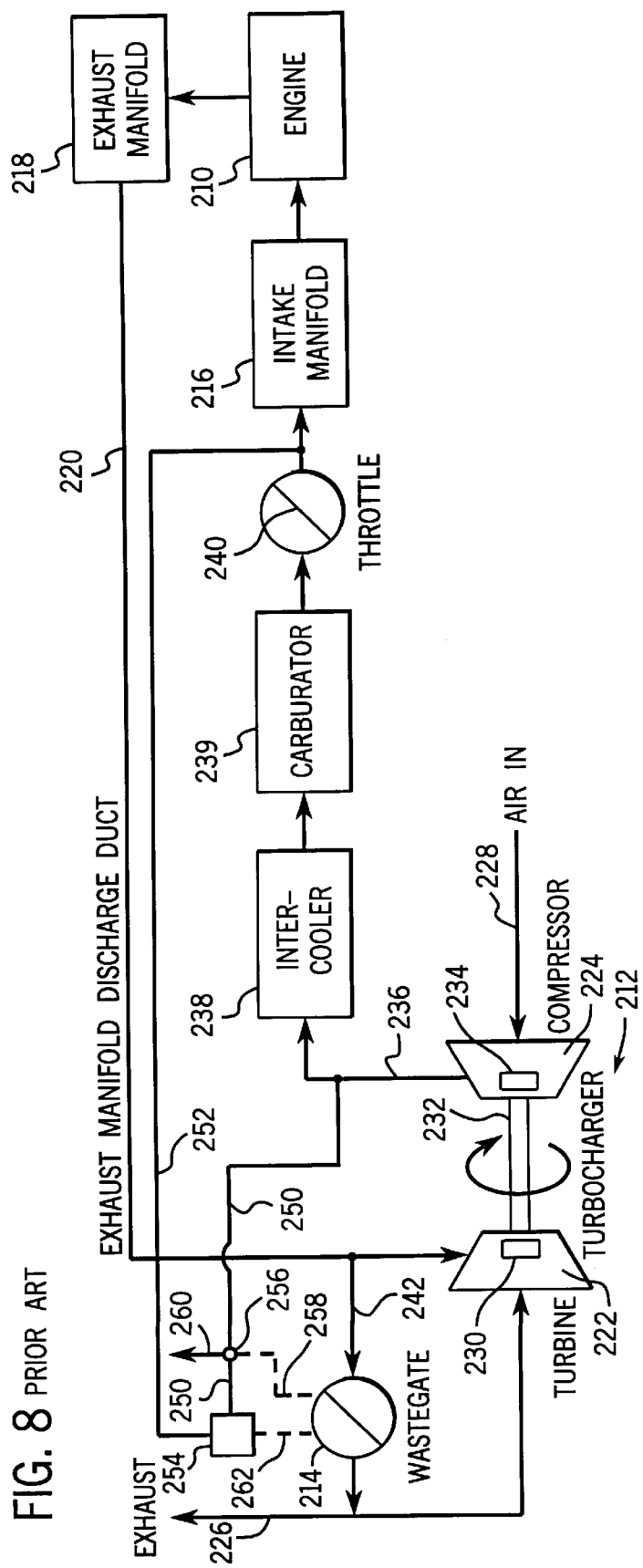

FIG. 8 is taken from FIG. 2 of the '047 patent and is a schematic drawing illustrating a turbocharged internal combustion engine having a fixed $\Delta P$ wastegate control as is known in the prior art.

Figure 9:
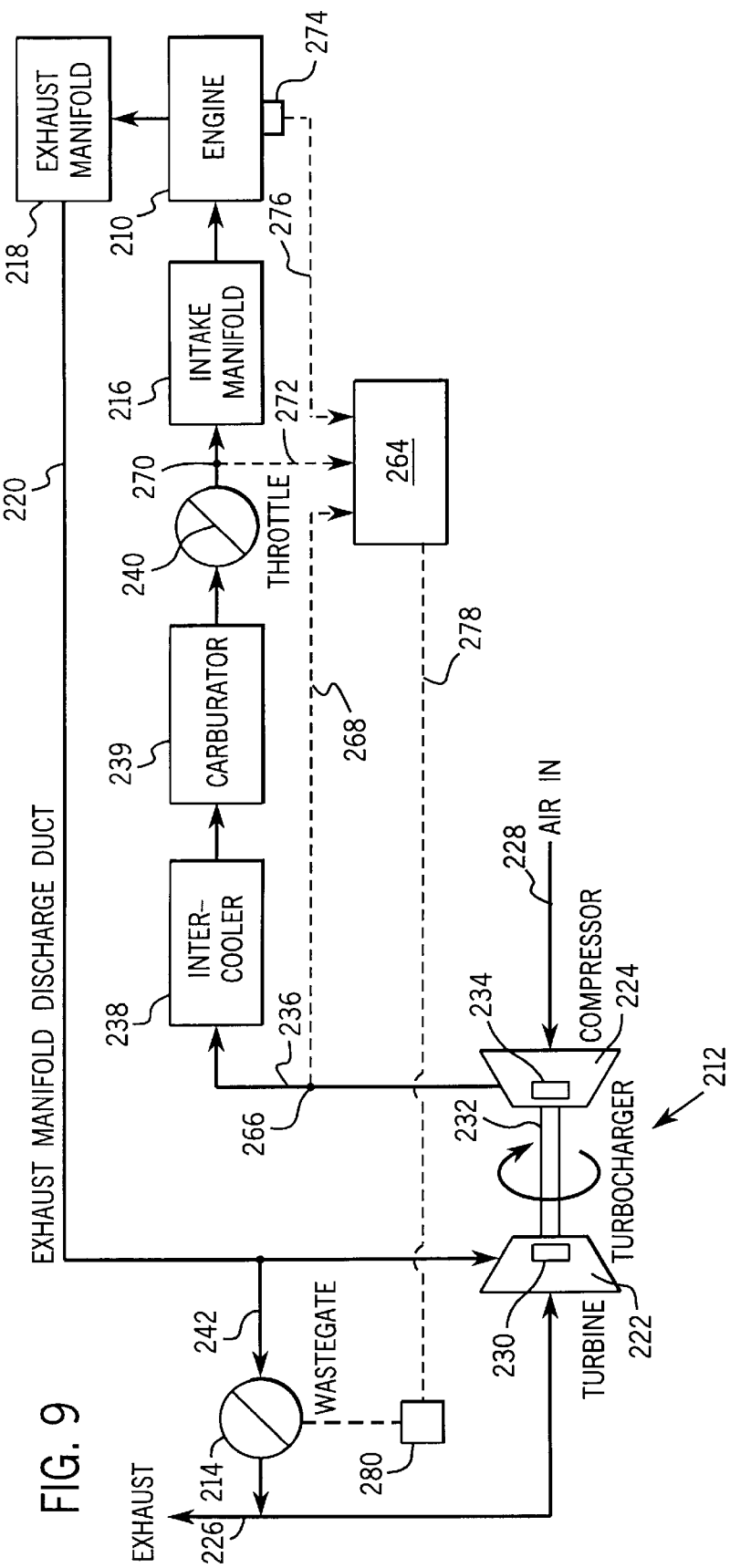

FIG. 9 is taken from FIG. 3 of the '047 patent and is a schematic drawing illustrating a turbocharged internal combustion engine having an adaptive $\Delta P$ wastegate control in accordance with the '047 patent.

FIG. 10 is taken from FIG. 4 of the '047 patent and is a flowchart illustrating the preferred scheme for continuously adjusting the desired throttle pressure reserve for the system shown in FIG. 9.

Figure 11:
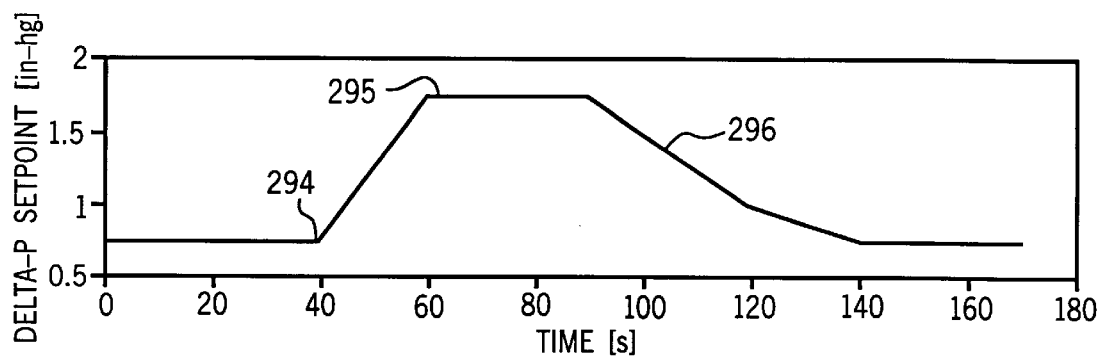
Figure 12:
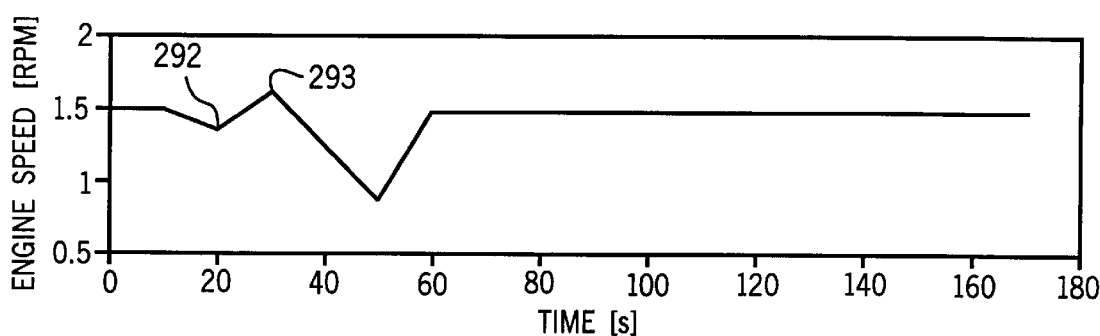
Figure 13:
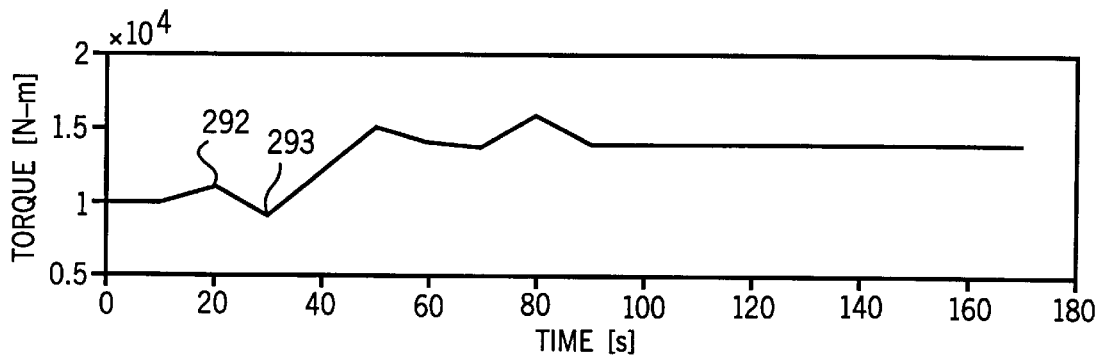

FIGS. 11 through 13 are graphs plotting the $\Delta P$ set point, engine speed, and engine torque versus time, which depict the response of the adaptive $\Delta P$ wastegate control shown in FIGS. 9 and 10 with respect to changes in engine load.

PRESENT INVENTION

Figure 14:
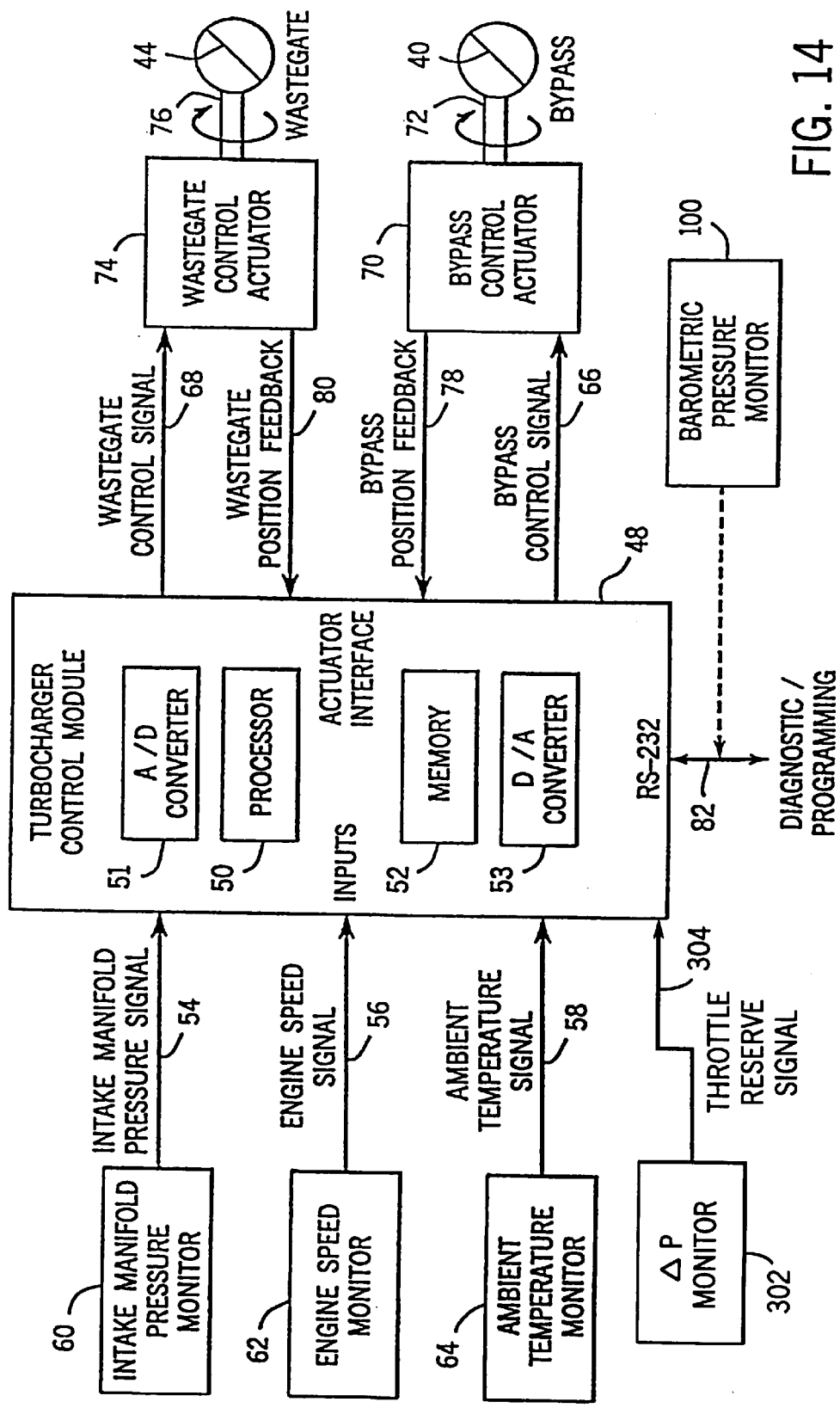

FIG. 14 is a schematic illustration of a control system in accordance with the present invention.

Figures 15, 16:
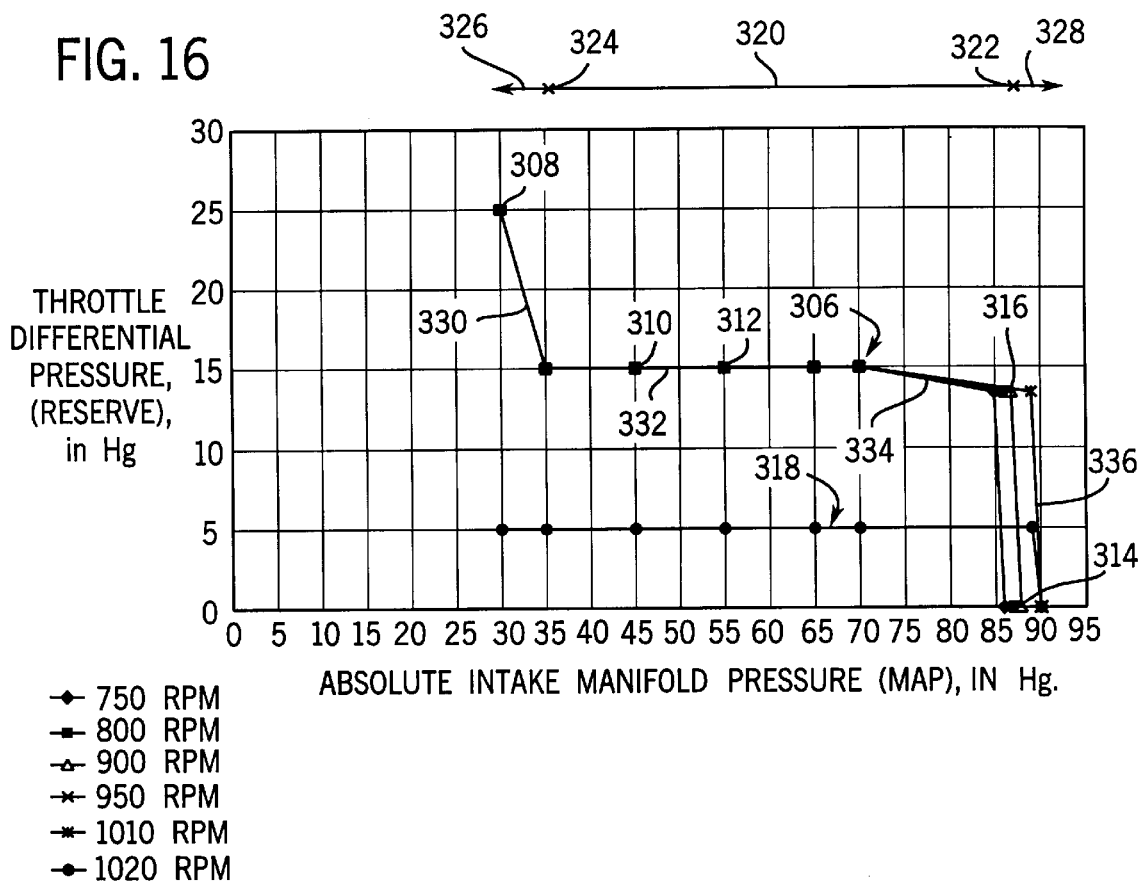

FIG. 15 is a table showing throttle reserve editing.

FIG. 16 is a plot of ΔP, throttle reserve, versus engine load, measured in absolute intake manifold pressure.

FIG. 17 is a table showing nonlinear variance of an error term.

FIG. 18 is a flowchart illustrating the preferred scheme for nonlinearly varying the error term.

DETAILED DESCRIPTION OF THE DRAWINGS

PRIOR APPLICATIONS

As shown in FIG. 1 and in accordance with the invention of the '236 patent, an engine 10 includes an intake manifold 12 and an exhaust manifold 14 functionally connected to a turbocharger 16. Turbocharger 16 includes a compressor 18 and turbine 20. The input of compressor 18 is connected to an air cleaner (not shown) with air intake duct 28. The air cleaner filters intake air from atmospheric/barometric pressure which is drawn into compressor 18 through air intake duct 28 under partial vacuum created by compressor wheel 30 in compressor 18. Compressor wheel 30 is driven by shaft 32 which is driven by turbine wheel 34 in turbine 20. Turbine wheel 34 is driven by engine exhaust provided to turbine 20 by engine exhaust duct 36 which is connected to exhaust manifold 14 of engine 10.

The output of compressor 18 is connected to intercooler 22 by compressor discharge duct 24. Compressor wheel 30 compresses intake air and forces it through compressor discharge duct 24 to intercooler 22 which functions as a heat exchanger removing excess heat from the turbocharged intake air as is commonly known. Turbocharged intake air is then channeled to throttle 38, intake manifold 12, and to engine 10. Throttle 38 creates a pressure differential depending on its position, such that air pressure into the throttle is at compressor discharge pressure and air pressure out of the throttle- is at intake manifold pressure.

Bypass valve 40, in bypass duct 42, connects compressor discharge duct 24 and engine exhaust duct 36 to functionally relieve pressure in compressor discharge duct 24 and increase airflow though compressor 18 by regulating airflow through bypass duct 42. Wastegate 44, in discharge duct 45, connects engine exhaust duct 36 and exhaust discharge duct 46 to functionally divert engine exhaust in exhaust duct 36, thereby decreasing exhaust mass airflow to turbine 20 which decreases the compressor discharge pressure produced by compressor 18 by regulating the amount of engine exhaust through discharge duct 45.

Turbocharger control module 48, FIG. 2, includes processor 50 and memory 52. In the preferred embodiment, memory 52 is an electrically erasable programmable read only memory (EEPROM) in which the parameters programmed therein can be changed and adjusted in the field. Turbocharger control module 48 has a plurality of engine characteristic signal inputs, namely intake manifold pressure signal 54, engine speed signal 56, and ambient temperature signal 58. The signals Ad are produced by a plurality of engine characteristic monitors, namely intake manifold pressure monitor 60 for sensing engine load, engine speed monitor 62 for sensing engine speed, and ambient temperature monitor 64 for sensing external temperature. Signals 54, 56 and 58 are input to module 48 in analog form and converted to digital form by analog to digital (A/D) converter 51. Processor 50, of turbocharger control module 48, processes the characteristic signals by selecting predetermined values from memory 52 for the bypass control signal 66 and wastegate control signal 68 based upon the values of the characteristic signals and a preprogrammed barometric pressure. Digital to analog (D/A) converter 53 converts the digital signal produced by processor 50 to the analog signals 66 and 68 within module 48.

Bypass control actuator 70 senses bypass control signal 66 and responds by rotating shaft 72 which changes the angular position of bypass valve 40. Similarly, wastegate control actuator 74 senses wastegate control signal 68 and rotates shaft 76 to change the angular position of wastegate 44. Bypass control actuator 70 and wastegate control actuator 74 are electromechanical controls that include a DC motor and a driving gear train (not shown) which are commonly known. Actuators 70 and 74 each include a potentiometer (not shown) for sensing the position of shafts 72 and 76 and producing a bypass position feedback signal 78 and wastegate position feedback signal 80, respectively. Turbocharger control module 48 senses the position feedback signals 78 and 80, converts the analog signals to digital signals in A/D converter 51, compares the digital signals to the desired positions of bypass valve 40 and wastegate 44 previously determined, creates revised control signals, converts the digital signals to analog signals in D/A converter 53 and responds with an appropriate bypass control signal 66 and wastegate control signal 68 to adjust bypass valve 40 and wastegate 44 to the desired positions.

Memory 52 of turbocharger control module 48 is preprogrammed with sets of predetermined parameters reflecting desired settings for bypass valve 40 and wastegate 44. Each set of parameters is based upon engine characteristic signals 54, 56, 58 and an operating system barometric pressure determined for a given altitude. The embodiment of the '236 patent uses three sets of parameters based on altitude, one for 0–3,000 feet, one for 3,000–5,000 feet and one for 5,000–7,000 feet; however, it is within the contemplation of the invention of the '236 patent to vary the number of sets, as well as the ranges within each set. RS-232 port 82 provides a service port to connect a computer to turbocharger control module 48, as is well known, for initial and reset programming and for diagnosing errors, in the module.

The turbocharger control system of the invention of the '236 patent is used on large, industrial internal combustion engines which are typically installed on stationary, non-mobile installation sites. Therefore, during the initial factory set-up, the barometric pressure is calibrated on an absolute basis, then later when the installation site altitude is determined, the turbocharger control module is programmed via RS-232 port 82 from barometric pressure monitor 100 to program processor 50 to select the correct set of preprogrammed parameters from memory 52 which correspond to the engine operating environment's barometric pressure. In this manner, turbocharger 16, FIG. 1, can be controlled to operate within the preferred bands of operation shown in FIG. 3 as kidney shaped curves 102, 104, 106 and 108, which are also known as islands of efficiency. FIG. 3 shows the ratio of compressor discharge pressure over barometric pressure versus the mass airflow through the turbocharger compressor. Optimum turbocharger compressor output is obtained when the mass airflow and pressure ratio are centered within the islands of efficiency 102, 104, 106 and 108. During testing at various engine speeds and loads, it was found that opening wastegate 44, FIG. 1, lowers the pressure ratio of the vertical axis, shown by wastegate lines 110, FIG. 3, while opening bypass valve 40, FIG. 1, increases the mass airflow of the horizontal axis but also may change the pressure ratio of the vertical axis, shown by bypass curves 112, FIG. 3. By testing the system at various engine speeds and loads, an optimum wastegate 44, FIG. 1, angular position and bypass valve 40 angular position can be determined to control compressor discharge pressure and mass airflow within the islands of efficiency 102, 104, 106 and 108, FIG. 3. Processor 50, FIG. 2, of turbocharger control module 48, processes the digital form of intake manifold pressure signal 54, engine speed signal 56 and ambient temperature signal 58, and being preprogrammed for the barometric pressure of the operating system's environment, accesses a look-up table in memory 52 and produces bypass control signal 66 and wastegate control signal 68, as previously described, which independently control bypass valve 40 and wastegate 44 to the desired positions to maintain operation within the efficiency islands 102, 104, 106 and 108, FIG. 3.

Bypass valve 40, FIG. 1, performs two functions. First, because during engine start-up the engine exhaust pressure in engine exhaust duct 36 is greater than the compressor discharge pressure in duct 24, bypass valve 40 is closed to prevent the passage of engine exhaust into compressor discharge duct 24. Second, bypass valve 40 regulates compressor discharge pressure and mass airflow once the engine is running at a minimum idle speed, typically 650 to 750 rpm. Once the minimum engine rpm is reached, bypass valve 40 is regulated through a range of effective bypass valve angles. Although testing was conducted on a range from 0° to 80° in FIG. 3, FIG. 4 displays the effective angles to be between 0° and 40°. FIG. 4 is a typical graph of bypass valve angle versus intake manifold pressure for various engine speeds. As shown, bypass valve 40, FIG. 1, is held closed until a minimum intake manifold pressure is obtained. Once the minimum intake manifold pressure is reached, in this case 30 inches of mercury, bypass valve 40 is set at a predetermined angle depending on the engine characteristic signals.

Similar to bypass valve 40, wastegate 44 was also tested in the range of 0° to 80° in FIG. 3; however, FIG. 5 shows the effective angles to be between 0° and 35°. FIG. 5 is a typical graph of wastegate angle versus intake manifold pressure for various engine speeds. When closed, wastegate 44, FIG. 1, causes nearly all of the engine exhaust to pass into turbine 20 and out exhaust discharge line 46. Wastegate 44 is closed, for example, during initial engine start-up to direct full engine exhaust through turbine 20 to drive turbine wheel 34 which drives shaft 32 and compressor wheel 30 until the intake manifold pressure reaches a minimum level as indicated by a pressure ratio between 1.25 and 1.4, FIG. 3. Typical effective wastegate angle settings are shown in FIG. 5 for engine speeds ranging from 750 to 1100 rpm at an exemplary altitude of 650 feet above sea level and an ambient temperature of 90° F. FIG. 5 shows how the invention of the '236 patent achieves the desired constant intake manifold pressure when the engine speed drops by changing the wastegate angle which results in near constant intake manifold pressure as shown, for example, at data points 122, 124, 126, 128, 130 and 132. Maintaining substantially constant intake manifold pressure, as indicated, achieves substantially constant torque output. Functionally, wastegate 44, FIG. 1, operates to divert increasing portions of the engine exhaust to exhaust discharge duct 46, and away from turbine 20, with increasing wastegate angle as shown in FIG. 5, which thereby limits the speed of turbine wheel 34, shaft 32, and compressor wheel 30, FIG. 1, to control compressor discharge pressure, as shown by wastegate lines 110, FIG. 3.

The angles of bypass valve 40 shown in FIG. 4 and wastegate 44 shown in FIG. 5 are illustrative only and may vary depending on system configuration. For example, an orifice 41, 43, FIG. 1, placed in bypass duct 42 and/or wastegate duct 45 allows a fuller range of effective angles of the wastegate and/or bypass valve and therefore decrease any error resulting from mechanical linkage tolerances. Further, using differing orifice sizes allows the use of the same wastegate and/or bypass valve in different engines and applications, thereby further reducing inventory and eliminating long procurement leadtimes for replacements.

Opening bypass valve 40, FIG. 1, increases mass airflow through compressor 18 of turbocharger 16, as shown by bypass curves 112, FIG. 3, by providing an additional route for compressor airflow to direct airflow into engine exhaust duct 36, FIG. 1. Opening wastegate 44 decreases intake compressor discharge pressure by diverting engine exhaust away from turbine 20 and routing it directly to exhaust discharge duct 46. As shown in FIG. 3 and previously described, by simultaneously adjusting the angular position of bypass valve 40, FIG. 1, and wastegate 44, turbocharger 16 can be controlled to operate within the kidney shaped islands of efficiency 102, 104, 106 and 108, FIG. 3.

The islands of efficiency 102, 104, 106 and 108 are common characteristic traits of centrifugal compressors—the type used in turbocharges—wherein operation within the center of the islands provide maximum compressor efficiency. It is also known that operating near surge line 84, FIG. 3, can create pressure waves between turbocharger 16, FIG. 1, and engine 10 resulting in unstable operation which can cause engine damage. Therefore, a slight safety factor is set into the predetermined parameters to operate slightly right of the center of the islands 102, 104, 106 and 108, FIG. 3.

In twin bank engine configurations (i.e. V-6, V-8, V-10, V-12, V-16, . . .) two turbochargers 16, FIG. 1, may be used for providing turbocharged air to engine 10 through intercooler 22. In such an arrangement, one larger bypass valve 40 and wastegate 44 may be used. However, in the invention of the '236 patent, two bypass valves 40 and two wastegates 44 are each arranged as in FIG. 1 and, merge at intercooler 22. A single control module 48, FIG. 2, operates as previously described controlling both bypass valves 40 with a single bypass control actuator 70 and both wastegates 44 with a single wastegate control actuator 74. The multiple turbocharger system operates identically to the single turbocharger system except that consideration must be given for the mechanical tolerances between the two compressor wheels and the two turbine wheels. To compensate for such additional tolerances, it is preferred to operate the turbochargers further right of the center of the efficiency islands 102, 104, 106 and 108, FIG. 3, to avoid engaging the surge line 84 yet remaining within an island at all times.

Moving to the right of the efficiency islands 102, 104, 106 and 108, FIG. 3, is accomplished by increasing the mass airflow through compressor 18, FIG. 1, by slightly increasing the angular amount bypass valve 40 is opened, as shown by bypass curves 112, FIG. 3. The slight increase in mass airflow through the dual turbochargers offsets any tolerances due to a mismatch between the compressor wheels and/or the turbine wheels of the dual turbochargers by keeping a safe distance from surge line 84, yet maintaining operation within the efficiency islands. Under some conditions, the increase in airflow results in a loss of compressor discharge pressure as shown by bypass curves 112, FIG. 3. This pressure loss is compensated by decreasing the angular amount wastegate 44, FIG. 1, is opened. In other words, decreasing exhaust flow through wastegate 44, will increase the compressor discharge pressure to compensate for the pressure loss associated with further opening bypass valve 40.

An important requirement in carbureted internal combustion engines is to maintain a pressure reserve across throttle 38, FIG. 1. The pressure reserve can be determined by sensing the pressure on both sides of throttle 38 and subtracting the two sensed pressures to determine a ΔP which is considered the pressure reserve. The pressure reserve ΔP permits engine 10 to accept greater loads at constant speed or to accelerate at constant load upon the opening of throttle 38 without hesitation due to the lack of intake manifold pressure. However, to obtain optimum engine efficiency, it is desired to maintain throttle 38 in an open position to avoid blocking energy in the form of airflow into the engine. The amount of pressure reserve ΔP across throttle 38 can be regulated is by controlling the amount of compressor discharge pressure from compressor 18. This is accomplished by adjusting wastegate 44 to regulate the amount of engine exhaust through turbine 20 which controls compressor 18 output. By controlling the mass airflow rate through compressor 30, throttle 38 can be opened to a greater angle thereby obtaining greater engine efficiency by reducing the exhaust back pressure associated with the higher compressor discharge pressure, yet maintaining enough pressure reserve ΔP to accelerate or accept additional engine loading without hesitation. This increase in throttle angle also reduces energy loss across the throttle, thereby increasing engine efficiency.

Another common problem with turbocharged engines overcome by the invention of the '236 patent is that the typical nonlinear throttle angle profile curve 114, FIG. 6, which is most evident in cold climates, is now more linear, shown as curve 116, which results in improved throttle control. FIG. 6 shows the throttle angle versus brake mean effective pressure graph for an exemplary 1,000 rpm engine speed. Prior to the invention of the '236 patent, as an increasing load is applied to the engine, for example 0 to 210 psi BMEP, as shown in FIG. 6, the throttle angle must increase quickly to compensate for turbocharger lag, which is an inherent condition of turbocharged engines, but once the turbocharger creates enough compressor discharge pressure, the throttle angle must be quickly reduced thereby creating an inflection point 118, FIG. 6. The rapid changes in throttle angle were required to maintain constant engine rpm with the increasing compressor discharge pressure. Once the compressor output reaches a plateau, the throttle angle must be reduced to compensate for the increased compressor discharge pressure until the increase in load overcomes the increase in turbocharger output at which point the throttle angle must again be increased to maintain engine speed. However, this erratic nonlinear throttle angle curve 114 has been extremely difficult to implement with accuracy. Throttle angle is controlled by a governor (not shown) and in practice, compensating for turbocharger output with throttle angle results in erratic engine speeds and surges which are inefficient and undesirable.

The invention of the '236 patent provides stable operation by creating a more linear throttle angle versus load curve by simultaneously controlling the function of bypass valve 40, FIG. 1, and wastegate 44. Throttle angle curve 116, FIG. 6, is made more linear by adjusting bypass valve 40, FIG. 1. Exemplary bypass (P) valve angles are shown at test points 120, FIG. 6—for example, to achieve throttle angle curve 116 and pull a load (BMEP) of 125 psi, a bypass valve angle of 40°(40° BP) will result in a throttle angle of approximately 42° and at a load of 175 psi, a bypass valve angle of 30° (30° BP) will result in a throttle angle of approximately 46°. However, a byproduct of adjusting bypass valve 40 is a corresponding change in the pressure reserve ΔP across throttle 38, FIG. 1. Adjusting wastegate 44, as previously set forth, provides adequate pressure reserve ΔP as shown in FIG. 6. At each test point 120, the amount of pressure reserve ΔP is shown in inches of Mercury, Hg. At lower engine load conditions greater amounts of pressure reserve ΔP are required to allow additional load acceptance without hesitation. Opening wastegate 44 results in lowering the pressure reserve ΔP. At the upper load end of FIG. 6, a decreasing reserve ΔP is preferred because in this instance, the engine is at or near its rated loading capacity and little additional load would be permitted and therefore less pressure reserve is needed to maintain proper engine control, and a lower reserve ΔP provides more efficient operation, as previously described. For example, an engine rated at 190 psi BMEP, ad is the case in FIG. 6, a pressure reserve ΔP of approximately 12–14 inches of mercury is required at 125 psi BMEP, whereas, 5–7 inches of mercury is sufficient at 210 psi BMEP. Similar results can be achieved at various engine speeds, ambient temperatures and barometric pressures.

As shown in FIG. 5, when engine speed is reduced at constant load (i.e. constant intake manifold pressure), the wastegate angle is reduced which increases throttle reserve ΔP and provides more torque from the engine with lower speed than in previous speed insensitive systems which would lose intake manifold pressure at lower speeds resulting in decreased torque output. FIG. 5 discloses efficient wastegate angles for each particular engine speed to achieve a desired intake manifold pressure and pressure reserve ΔP.

FIGS. 7 and 8 are taken from FIGS. 1 and 2, respectively, of the '047 patent and schematically illustrate two versions of industrial internal engine systems 210 having a turbocharger 212 and a wastegate valve 214 which are controlled in a manner known in the art. In particular, FIG. 7 illustrates a system with a standard wastegate control otherwise known as a maximum boost regulator, and FIG. 8 illustrates a system with a fixed ΔP control (i.e. a fixed throttle pressure reserve control).

In FIG. 7, an engine 210 includes an intake manifold 216 and an exhaust manifold 218. Exhaust discharges from the exhaust manifold 218 through an exhaust manifold discharge duct 220, and flows to the turbocharger 212. The turbocharger includes a turbine 222 and a compressor 224. The engine exhaust passes through the turbocharger 212 into an exhaust outlet duct 226.

Ambient air inputs the compressor 224 through an air intake duct 228. An air cleaner (not shown) is normally located in the air intake duct 228. Since the ambient air inputting the compressor 224 is drawn through an air cleaner, the air in intake duct 228 is normally under a partial vacuum. Energy in the exhaust gases flowing through the turbine 222 drives a turbine wheel 230, which in turn drives a shaft 32 to drive a compressor wheel 234. The compressor wheel 234 compresses (i.e. pressurizes, turbocharges, or boosts) the ambient air flowing to the compressor 224 through air intake duct 228, and pressurized intake air outputs the compressor 224 in compressor discharge duct 236. The pressurized air in compressor discharge duct 224 is forced through an intercooler 238 that functions as a heat exchanger to remove excess heat from the turbocharged intake air. The turbocharged intake air is then channeled through a carburetor 239, a throttle 240, and the intake manifold 216 to engine 210.

The carburetor 239 is typically located between the intercooler 238 and the throttle 240. Fuel is mixed with the compressed air within the carburetor 239, and the fuel-air mixture then flows to the throttle 240. In large industrial internal combustion engines, the fuel is typically natural gas, although other fuels can be used. Alternatively, the carburetor 239 can be located upstream of the compressor 224 in the air intake duct 228. In such a configuration, the compressor 224 for the turbocharger 212 compresses the air-fuel mixture in duct 228 and discharges the pressurized air-fuel mixture in the compressor discharge duct 236.

The throttle 240 creates a pressure drop such that the air pressure into the throttle 240 is at the compressor discharge pressure or slightly below, and the air pressure downstream of the throttle 240 is at the intake manifold pressure. The amount of the pressure drop across the throttle 240 is referred to as the throttle pressure reserve. The throttle pressure reserve, or the amount of pressure drop across the throttle, depends both on the air flow through the throttle 240 and the position of the throttle 240.

A wastegate passage 242 is provided between the exhaust manifold discharge duct 220 from the exhaust manifold 218 and the exhaust outlet duct 226 from the turbine 222 of the turbocharger 212. A wastegate valve 214 is located within the wastegate passage 242 to regulate the amount of energy in the engine exhaust bypassing the turbine 222 of the turbocharger 212. When the wastegate valve 214 is partially or fully open, engine exhaust in the exhaust manifold discharge duct 220 is diverted to the exhaust outlet duct 226, thereby decreasing the exhaust mass flow to the turbine 222 in the turbocharger 212. Decreasing the exhaust mass flow to the turbine 222 reduces the output of the compressor 224, and in turn lowers the compressor discharge pressure in compressor discharge duct 236.

The prior art standard wastegate control shown in FIG. 7 is a maximum boost regulator and includes a wastegate valve actuator 246 and a pressure tap 248. The pressure tap 248 typically monitors the pressure in the compressor discharge duct 236 upstream of the throttle 240. While FIG. 7 shows the pressure tap 248 monitoring the pressure in the compressor discharge duct 236 between the intercooler 238 and the compressor 234, it is also known to monitor the air pressure in the compressor discharge duct 236 between the throttle 240 and the intercooler 238.

The pressure tap 248 is connected to a spring actuated wastegate valve actuator 246. The actuator 246 controls the wastegate valve 214 as illustrated schematically by line 247. In the particular embodiment shown in FIG. 7, the wastegate valve 214 will remain closed until the pressure in the compressor discharge duct 236 and the pressure tap 248 is sufficient to actuate the spring loaded actuator 246. Line 245 from the wastegate valve actuator 246 is open to ambient conditions and is shown to indicate that the actuator 246 actuates wastegate valve 214 depending on the difference of the pressure in line 248 above the ambient pressure in line 245. This type of standard wastegate control, or maximum boost regulator, serves to limit the operation of the compressor 224 when the engine is running at high loads such as 80% to 90% of maximum total load. The prior art system of FIG. 7 therefore limits maximum output of the engine 210 by limiting the output or boost of the compressor 224 in the turbocharger 212.

Although FIG. 7 depicts a mechanical configuration for the standard wastegate control, electronic schemes using a pressure transducer for measuring the pressure in the compressor discharge duct 236 are known in the art.

While the pressure tap 248 is shown in FIG. 7 to monitor the pressure in the compressor discharge duct 236 upstream of the throttle 240, the pressure tap 248 can alternatively monitor the intake manifold pressure 216 downstream of the throttle 240, without significantly affecting the operation of the maximum boost regulator 246. This is because the throttle 240 will normally be fully open, or almost fully open, when the engine 210 is operating at high loads. Under such maximum boost conditions, the pressure downstream of the throttle 240 will be substantially the same or slightly less than the pressure upstream of the throttle 240.

FIG. 8 depicts a fixed $\Delta P$ wastegate control as is known in the art. Besides the wastegate control, the system shown in FIG. 8 is similar to the system shown in FIG. 7 and like reference numerals are used in FIG. 8 where appropriate to facilitate understanding. The fixed $\Delta P$ wastegate control shown in FIG. 8 includes an upstream pressure tap 250 for monitoring the pressure in the compressor discharge duct 236 upstream of the throttle 242, and a downstream pressure tap 252 for monitoring the intake manifold pressure downstream of the throttle 240. As described with respect to the system shown in FIG. 7 the upstream pressure tap 250 can be located in the compressor discharge duct 236 between the intercooler 238 and the compressor 234, or alternatively between the intercooler 238 and the throttle 240.

The upstream pressure tap 250 communicates with a fixed $\Delta P$ wastegate valve actuator 254 as does the downstream pressure tap 252. A boost regulator 256 is placed in the upstream pressure tap 250, or can alternatively be placed in the downstream pressure tap 252. The boost regulator 256 operates similar to the boost regulator 246 described in FIG. 7 and functions to open the wastegate valve 214 as illustrated schematically by line 258 when the pressure in the pressure tap 250, or alternatively line 252, exceeds a threshold value to control the maximum output of the compressor 224 normally at 80% to 90% of the maximum engine load. Line 260 from the maximum boost regulator 256 is open to ambient conditions and is shown to indicate that the boost 256 actuates the wastegate valve 214 depending on the difference of the pressure in line 250 (or alternatively line 252) above ambient pressure in line 260.

The fixed $\Delta P$ wastegate actuator 254 operates to control the wastegate valve 214 as illustrated schematically by line 262 when the engine is operating at partial load in order to maintain a fixed pressure difference between pressure taps 250 and 252. In other words, the fixed $\Delta P$ wastegate actuator 254 operates to maintain a fixed throttle pressure reserve. In particular, the fixed $\Delta P$ wastegate actuator 252 opens wastegate valve 214 at light or medium engine loads when the compressor discharge pressure monitored by the upstream pressure tap 250 exceeds the intake manifold pressure monitored by the downstream pressure tap 252 more than a selected throttle pressure reserve, or $\Delta P$ set point. For a fixed $\Delta P$ wastegate control typically has a $\Delta P$ set poult or desired throttle pressure reserve of about 9 inches of mercury (4 psi) for steady loads, and a $\Delta P$ set point of 13 inches of mercury (6 psi) for fluctuating loads.

Although FIG. 8 depicts a mechanical configuration for a fixed $\Delta P$ wastegate control, electronic schemes using an upstream pressure transducer for sensing the compressor discharge pressure and a downstream pressure transducer for measuring the intake manifold pressure are known in the art, for example the '236 patent, wherein the throttle pressure reserve can be determined electronically by sensing the pressure both upstream and downstream of the throttle, and subtracting the two sensed pressures electronically. The desired throttle pressure reserve can be adjusted depending on a desired load response of the engine which can be mapped into an electronic controller depending on various conditions.

FIG. 9 schematically illustrates a large industrial internal engine system 210 having a turbocharger 212 and a wastegate valve 214 that is controlled in accordance with the '047 patent. Besides the wastegate control, the system shown in FIG. 9 is similar to the system shown in FIGS. 7 and 8, and like reference numerals are used in FIG. 9 where appropriate to facilitate understanding. An electronic controller 264 is used to adaptively generate a desired throttle pressure reserve value so that load response is improved when the engine load is fluctuating, and fuel consumption is improved when engine load is relatively steady.

An upstream pressure sensor 266 monitors the pressure in the compressor discharge duct 236, and generates an upstream pressure signal in response thereto. The upstream pressure signal is transmitted to the electronic controller 264 through line 268. The upstream pressure signal is preferably an analog signal such as a 0–5 volt signal or a 4–20 milliamp signal. A downstream pressure transducer 270 senses the intake manifold pressure, and generates a downstream pressure signal in response thereto. The downstream pressure signal is transmitted to the electronic controller 264 through line 272. The downstream pressure signal is also preferably an analog signal, such as a 0–5 volt signal or a 4–20 milliamp signal.

An engine load sensor 274 monitors the engine load, and generates an engine load signal in response thereto. The engine load signal is transmitted to the electronic controller 264 through line 276. The engine load sensor 274 can generally be any type of sensor that senses some characteristic of the operation of the engine 210 from which the engine load can be determined or inferred. For instance, in a system where the engine 210 drives an electric generator, the engine load can be measured directly by measuring the electrical power output from the generator using a watt transducer or the like. Another common way of inferring changes in engine load would be to monitor the intake manifold absolute pressure using a manifold absolute pressure sensor on the intake manifold 216. The preferred way of monitoring the change in engine load is to monitor engine speed preferably using an engine rpm sensor, and generating an engine rpm signal which is transmitted to the electronic controller. Engine speed change is a practical and reliable surrogate for engine load change in applications involving large industrial internal combustion engines because fluctuations in engine speed indicate that there has been a fluctuation in engine load. A suitable type of rpm sensor is the type of sensor using a magnetic pick-up to generate a signal based on the frequency of engine revolutions.

The electronic controller 264 adaptively generates a desired throttle pressure reserve based not only on the current engine load signal, but also based on previous engine load signals. If the electronic controller 264 determines that the engine load is fluctuating, the electronic controller 264 will set the desired throttle pressure reserve value at a relatively large value. If the electronic controller 264 determines that the engine load is relatively steady, the electronic controller 264 will set the desired throttle pressure reserve at a relatively small value. Once the electronic controller 264 has determined the desired throttle pressure reserve value, the electronic controller 264 compares that desired throttle pressure reserve value to the actual throttle pressure reserve which is determined as the difference between the upstream pressure signal in line 268 and the downstream pressure signal in line 272.

The electronic controller 264 outputs a wastegate control signal in line 278 to operate wastegate actuator 280 which controls the position of the wastegate valve 214. If the actual throttle pressure reserve is greater than the desired throttle pressure reserve value, the electronic controller 264 transmits a control signal in line 278 instructing the wastegate actuator 280 to open the position of the wastegate valve 214. If the actual throttle pressure reserve is less than the desired throttle pressure reserve value, the electronic controller 264 transmits a signal in line 278 instructing the wastegate actuator 280 to close the position of the wastegate valve 214.

The preferred scheme for adaptively generating the desired throttle pressure reserve value in the electronic controller 264 is illustrated schematically in FIG. 10. At engine start-up (time (t)=0), the desired throttle pressure reserve value, or $\Delta P$ set point, is typically about 13 inches of mercury, which corresponds to a typical desired throttle pressure reserve value for a fluctuating load. However, a different $\Delta P$ set point at engine start-up can be selected. The diagram in FIG. 10 indicates that after engine start-up (i.e. time (t=ø), the desired throttle pressure reserve value will be continuously adapted in accordance with a loop-type scheme, unless the desired throttle pressure reserve value is adjusted for some other reason. For instance, fuel consumption at light loads can sometimes be relatively unimportant, so it may be desirable to fix the throttle pressure reserve value at a high value for light loads and use the adaptive scheme only for medium or high loads.

Block 282 illustrates that a desired throttle pressure reserve value is initially selected at time (t)=0. FIG. 10 indicates that the desired throttle pressure reserve value for each subsequent sampling period, block 284, is determined by subtracting a fixed or constant gain, block 286, and adding a proportional gain, block 288, and an integral gain, block 290, to the previous desired throttle pressure reserve value. The sampling rate for the electronic controller would typically be in the range of 10–50 Hz, however, the invention is not limited thereto.

It is preferred that the fixed gain, block 286, always be subtracted from the previous desired throttle pressure reserve value. Subtracting the fixed gain, block 286, will drive the desired throttle pressure reserve value downward, therefore improving engine efficiency, unless the proportional gain term, block 288, or the integral gain term, block 290, push the desired throttle pressure reserve upward when improved engine response is desired because of past or current load fluctuations.

Block 288 indicates that a proportional gain term is added to drive up the desired throttle pressure reserve value when the current load on the engine increases. The purpose of block 288 is to allow the desired throttle pressure reserve value to climb if the engine load increases. It may be desirable to place maximum limits on the increase of the desired throttle pressure reserve value to avoid surge problems that can occur when the load on the compressor 224 is relatively unstable. The proportional term, block 288, typically includes a term indicating the change in load multiplied by a proportional gain value. Block 290 indicates that an integral gain term is added to drive up the desired throttle pressure reserve if the load has been fluctuating historically over time.

The preferred way of carrying out the scheme shown in FIG. 10 involves the use of negative speed error as an indication of engine load. Negative speed error can be defined as the desired speed set point for the engine 210 less the actual speed of the engine 210. In electronic generator applications, the desired speed set point would typically be 60 Hz in the United States and 50 Hz in Europe. Negative speed error is an indication of engine load because the engine 210 will tend to slow down as load increases. Using negative speed error as a surrogate for engine load, the scheme in FIG. 10 can be carried out in accordance with the following equation (1):

$$\Delta P(t+1) = -GAIN + P * NSE + I * \int NSE + \Delta P(t)$$

where:

ΔP(t)=the desired throttle pressure reserve value for a current time period;

GAIN=a fixed value chosen to slowly drive the desired throttle pressure reserve value towards zero;

P=proportional gain term;

NSE=negative speed error (i.e. a preselected engine speed set point less the engine speed as measured by the engine speed sensor);

I=integral gain term;

∫NSE=integral of the negative speed error over a desired length of time in the past.

In applying equation (1), it is preferred that negative speed error (NSE) be set to zero when the actual engine speed is above the pre-selected engine speed set point. Using equation (1), the fixed gain term, block 286, will drive the desired throttle pressure reserve value lower and lower until the onset of difficulties with engine controllability due to fluctuating engine loads occurring with insufficient throttle pressure reserve. Of course, ΔP(t+Δ) is never allowed to go below zero and preferably never allowed to go below a small positive value. Each of the gain terms in equation (1) (i.e. GAIN, P and I) can be selected relative to one another to determine the behavior of the control scheme. Preferably, the gains terms (GAIN, P, and I) will be chosen so that it will take the desired throttle pressure reserve value at least several minutes to recover after an aberration in load has occurred.

A dead band for the negative speed error can also be used by setting the negative speed error to zero if the actual engine speed is lower than the pre-selected engine speed set point by only a few rpm. Such a negative speed dead band will prevent unnecessary adjustment of the desired throttle pressure reserve value in circumstances where the engine speed drops only slightly for reasons not associated with the engine load such as spark plug misfires, etc.

FIGS. 11 through 13 illustrate graphically the response of the adaptive ΔP wastegate control to engine load changes. FIGS. 12 and 13 show that engine load torque changes at time=20 seconds indicated by point 292. This change in engine load at point 292 results in an undesirable engine speed change. At point 293, the engine load torque decreases, and the engine speed correspondingly increases. FIG. 11 shows the ΔP set point, or desired throttle pressure reserve value, begins changing at point 294 in response to both of the load changes 292 and 293. The desired throttle pressure reserve value ramps up to a sufficient value to maintain a constant engine speed indicated by reference numeral 295. After the load has held steady, the desired throttle pressure reserve is reduced to improve fuel consumption as depicted by reference numeral 296. Reducing the desired throttle pressure reserve value not only tends to improve fuel consumption, but can also reduce undesirable emissions that can occur during transient load changes.

It can therefore be appreciated that the control scheme described in FIG. 10, and equation (1), not only takes into account the past load history on the engine, but also schedules the desired throttle pressure reserve value as a function of current changes in engine load.

After an extended period of time with no load changes, the wastegate will have been adjusted to provide for a very low throttle reserve. When an incipient load change occurs under these conditions, there will be very little throttle pressure reserve to accommodate the sudden load increase. To overcome this problem, it is preferred to apply transient enrichment of the fuel/air mixture entering the engine 210 when there is a sudden load increase after a period of extended load steadiness.

PRESENT INVENTION

FIG. 14 is like FIG. 2 and uses reference numerals from FIGS. 1 and 2 where appropriate to facilitate understanding. A ΔP sensor or monitor 302 monitors differential pressure across throttle 38, also known as throttle reserve, and provides throttle reserve signal 304 to control module 48. In preferred form, delta P sensor 302 is provided by two pressure transducers, one upstream and one downstream of the throttle. This is desired because such pressure transducers are more robust than a single differential pressure sensor. The latter is sensitive to pressure spikes, such as engine backfires, and would likely fail sooner than a pair of pressure transducers. Electronic control module 48 controls the engine in response to engine speed and engine load, to provide desired throttle reserve as sensed by delta P sensor 302. Electronic controller 48 controls wastegate control actuator 74 to control wastegate 44, to provide desired throttle reserve. Engine load is sensed by sensing intake manifold pressure. Engine 10 is controlled by turbocharger control module 48 to vary differential pressure across throttle 38 according to a predetermined throttle reserve profile relative to engine speed and engine load, the latter being measured by intake manifold pressure.

FIG. 15 shows the throttle reserve editing table, with column headings for differing engine speeds in RPM, revolutions per minute, where Pa is map pressure, absolute manifold air pressure in inches, In., of mercury, Hg, and Res is reserve differential pressure, in inches, In., of mercury, Hg, which is the differential pressure across throttle 38, delta P, or ΔP, also known as throttle reserve. The table in FIG. 15 is shown in graphical form in the plot in FIG. 16, where absolute intake manifold pressure, MAP, in inches mercury is shown on the abscissa, the horizontal x-axis, and throttle differential pressure in inches mercury, delta P, throttle reserve, is shown on the ordinate, the vertical y-axis. For engine speeds in the range between 800 rpm and 1010 rpm, the throttle reserve has a profile as shown at 306. This engine speed range has a first high throttle reserve value as shown at data point 308, of 25 In. Hg., at a first low engine load value of 30 In. Hg., a second main operating range throttle reserve value of 15 In. Hg., as shown at a series of data points 310, 312, etc., at a respective series of second main operating range engine load values of 45 La. Hg., 55 In. Hg., etc., and a third low throttle reserve value as shown at data point 314 of 0 In. Hg. at a third high engine load value of 92 to 95 In. Hg. The set of main operating range data points, 310, 312, etc. also includes a set of transition data points at 316 having a slightly lower throttle pressure reserve of 13 In. Hg., as shown at data point 7, left column of table in FIG. 15, at engine load, of 89 to 92 In. Hg. of absolute intake manifold pressure, as shown in the columns for 800 to 1010 rpm.

The throttle reserve value of 25 In. Hg. at data point 308 in FIG. 16 is intentionally set at an unobtainably high value such that wastegate 44 is continually driven towards its closed condition at the noted first low engine load value of 30 In. Hg. The wastegate has a closed condition providing maximum boost by the turbocharger, and an open condition providing minimum boost by the turbocharger. By continually driving the wastegate towards its closed condition at the noted first low engine load value of 30 In. Hg., maximum boost is made available.

The noted third low throttle reserve value at data point 314 is intentionally set at a low enough value to eventually cause the engine to stall, such that the wastegate is continually driven towards its open condition at the noted third high engine load values of 92 to 95 In. Hg. By reducing the throttle reserve to zero, causing the wastegate to open, output power is limited, eventually causing the engine to stall. This is an intentional overload protection strategy.

Another throttle reserve profile is provided at 318 in the plot in FIG. 16 for a higher engine speed range of 1020 rpm, last column in FIG. 15, having a fourth throttle reserve value of 5 In. Hg. This is not a normal operating speed, but is an overspeed condition for the engine. The noted fourth throttle reserve value of 5 In. Hg. at profile 318 is less than the noted first value at 308 and less than the noted second part load range values at 310, 312, including transition points 316, and is greater than the noted third stall condition value at 314. The noted fourth throttle reserve value along profile 318 for the noted overspeed condition is the same for each of the noted engine load values.

The profile in FIG. 16 has a main operational range 320 of engine load values having a high end 322 and a low end 324. The noted main operational second engine load value at data points 310, 312, etc. are within operational range 320. Throttle reserve is set at the noted first throttle reserve value at data point 308 along a low load range 326 of engine load values extending toward lower engine load values from low end 324 of operational range 320. Throttle reserve is set at the noted third low throttle reserve value at data point 314 along a high load range 328 of engine load values extending toward higher engine load values from high end 322 of operational range 320. Operational range 320 along profile 306 in the plot in FIG. 16 is substantially longer along the abscissa than each of the low load and high load ranges 326 and 328. The slope of profile 306 at 330 along low load range 326 is substantially steeper than the slope at 332 along operational range 320, and also substantially steeper than the slope at 334 along operational range 320. The slope of profile 306 at 336 along high load range 328 is substantially steeper than the slope at 332 along operational range 320, and also substantially steeper than the slope at 334 along operational range 320.

FIG. 17 shows a nonlinear gain schedule for updating desired delta P with an error term by varying the error term nonlinearly with throttle reserve error, to rapidly bring delta P within a given window, and then more slowly change delta P once it is within such window. The look-up table in FIG. 17 shows twelve data points in the left column, reserve error, delta P, in In. Hg. in the second column, and the percent gain provided by the error term in the third column. As seen, the error term in the third column is set to vary in a nonlinear manner relative to changes in reserve error delta P. FIG. 18 is similar to FIG. 10 and uses like reference numerals where appropriate to facilitate understanding. The nonlinear error term is provided in block 338, in place of proportional term block 288. A desired delta P at a future time $t_1$ is set by adding the error term at block 338 to the desired delta P at present time to, the error term being a function of the difference between monitored delta P sensed by sensor 302 and desired delta P. The error term is varied nonlinearly with throttle reserve error according to the schedule in FIG. 17. The remaining part of the algorithm in FIG. 18 is the same as FIG. 10.

It is recognized that various equivalents, alternatives and modifications are possible within the scope of the appended claims.

What is claimed is:

1. A controlled power system comprising an internal combustion engine having a throttle with a differential pressure, delta P, thereacross, said delta P also known as throttle reserve, a turbocharger connected to said engine and having a turbine and a compressor, an electronic controller controlling said engine to control throttle reserve, a delta P sensor sensing said differential pressure across said throttle, and wherein said electronic controller controls said engine in response to at least one engine parameter, to provide desired throttle reserve.

2. The invention according to claim 1 wherein said at least one engine parameter comprises engine speed.

3. The invention according to claim 1 wherein said at least one engine parameter comprises engine load.

4. For the invention according to claim 3 wherein said engine has an intake manifold, and wherein said engine load is sensed by sensing intake manifold pressure.

5. The invention according to claim 1 comprising two said engine parameters, namely engine speed and engine load.

6. The invention according to claim 1 comprising a wastegate connected to said turbine, and wherein said electronic controller controls said wastegate to provide desired throttle reserve, and wherein said at least one engine parameter comprises engine speed, and wherein said electronic controller controls said engine by controlling said wastegate in response to engine speed, to provide desired throttle reserve.

7. The invention according to claim 1 comprising a wastegate connected to said turbine, and wherein said electronic controller controls said wastegate to provide desired throttle reserve, and wherein said at least one engine parameter comprises engine load, and wherein said electronic controller controls said engine by controlling said wastegate in response to engine load, to provide desired throttle reserve.

8. The invention according to claim 1 comprising a wastegate connected to said turbine and wherein said electronic controller controls said wastegate to provide desired throttle reserve, and comprising two said engine parameters, namely engine speed and engine load, and wherein said electronic controller controls said engine by controlling said wastegate in response to both said engine speed and said engine load, to provide desired throttle reserve.

9. The invention according to claim 1 wherein said delta P sensor comprises a pair of pressure transducers, one upstream of said throttle and one downstream of said throttle.

10. A controlled power system comprising:
a turbocharger connected to said engine and having a turbine and a compressor;
a wastegate connected to said turbine;
an engine speed sensor sensing engine speed sensor sensing engine speed and providing an engine speed signal;
an engine load sensor sensing engine load and providing an engine load signal;
a delta P sensor sensing differential pressure across said throttle and providing a delta P signal, said delta P also known as throttle reserve;
an electronic controller controlling said wastegate in response to said engine speed signal and in response to said engine load signal to provide desired throttle reserve as sensed by said delta P sensor.

11. A method for controlling an internal combustion engine having a throttle, and a turbocharger with a turbine and a compressor, comprising sensing differential pressure across said throttle, delta P, also known as throttle reserve, and controlling said engine to vary throttle reserve according to a predetermined throttle reserve profile relative to at least one engine parameter.

12. The invention according to claim 11 comprising varying throttle reserve according to engine speed.

13. The invention according to claim 11 comprising varying throttle reserve according to engine load.

14. The invention according to claim 11 comprising varying throttle reserve according to engine speed and engine load.

15. The invention according to claim 11 wherein said engine has a wastegate connected to said turbine, and comprising varying throttle reserve by controlling said wastegate.

16. The invention according to claim 15 comprising controlling said wastegate in response to engine speed.

17. The invention according to claim 15 comprising controlling said wastegate in response to engine load.

18. The invention according to claim 15 comprising controlling said wastegate in response to both engine speed and engine load.

19. The invention according to claim 11 comprising providing a first throttle reserve profile in a plot of throttle reserve versus engine load for a first engine speed range having a first throttle reserve value at a first engine load value, a second throttle reserve value at a second engine load value, and a third throttle reserve value at a third engine load value, wherein said first throttle reserve value is greater than said second throttle reserve value, said second throttle reserve value is greater than said third throttle reserve value, said first engine load value is less than said second engine load value, said second engine load value is less than said third engine load value.

20. The invention according to claim 19 wherein said engine has a wastegate connected to said turbine, said wastegate having a closed condition providing maximum boost by said turbocharger, and an open condition providing minimum boost by said turbocharger, and comprising varying said throttle reserve by controlling said wastegate.

21. The invention according to claim 20 comprising setting said first throttle reserve value at an unobtainably high value such that said wastegate is continually driven towards said closed condition at said first engine load value.

22. The invention according to claim 20 comprising setting said third throttle reserve value at a low enough value to eventually cause said engine to stall, such that said wastegate is continually driven towards said open condition at said third engine load value.

23. The invention according to claim 14 comprising providing a second throttle reserve profile in said plot for a second engine speed range and having a fourth throttle reserve value, said second engine speed range being higher than said first engine speed range.

24. The invention according to claim 23 comprising setting said fourth throttle reserve value less than said first throttle reserve value at said first engine load value.

25. The invention according to claim 23 comprising setting said fourth throttle reserve value less than said second throttle reserve vie at said second engine load value.

26. The invention according to claim 23 comprising setting said fourth throttle reserve value greater than said third throttle reserve value at said third engine load value.

27. The invention according to claim 23 comprising setting said fourth throttle reserve value less than said first and second throttle reserve values, and greater than said third throttle reserve value.

28. The invention according to claim 27 comprising setting said fourth throttle reserve value to be the same at each of said first, second and third engine load values.

29. The invention according to claim 19 comprising setting said throttle reserve at said second throttle reserve value at at least one point along an operational range of engine load values having a high end and a low end, said second engine load value being within said operational range, setting said throttle reserve at said first throttle reserve value along a low load range of engine load values extending toward lower engine load values from said low end of said operational range, setting said throttle reserve at said third throttle reserve value along a high load range of engine load values extending toward higher engine load values from said high end of said operational range.

30. The invention according to claim 29 wherein said operational range along said plot is substantially longer than each of said low load and high load ranges.

31. The invention according to claim 29 wherein the slope of said profile of said plot along said low load range is substantially steeper than the slope along said operational range.

32. The invention according to claim 29 wherein the slope of said profile of said plot along said high load range is substantially steeper than the slope along said operational range.

33. The invention according to claim 29 wherein the slope of said profile of said plot along each of said low and high load ranges is substantially steeper than the slope along said operational range.

34. The invention according to claim 11 comprising setting a desired delta P at a future time $t_1$ by adding an error term to desired delta P at a present time $t_0$, said error term being a function of the difference between delta P and desired delta P, and comprising varying said error term nonlinearly with throttle reserve error, to rapidly bring delta P within a given window, and then more slowly change delta P once it its within such window.

35. The invention according to claim 34 comprising nonlinearly varying said error term according to a look-up table.

* * * * *